United States Patent [19]
Kobayashi

[11] Patent Number: 5,689,584
[45] Date of Patent: Nov. 18, 1997

[54] METHOD OF AND APPARATUS FOR PATTERN RECOGNITION AND METHOD OF CREATING PATTERN RECOGNITION DICTIONARY

[75] Inventor: Takao Kobayashi, Asaka, Japan

[73] Assignee: Bird Systems Research Institute, Inc., Tokyo, Japan

[21] Appl. No.: 500,995

[22] PCT Filed: Dec. 20, 1994

[86] PCT No.: PCT/JP94/02160

§ 371 Date: Aug. 8, 1995

§ 102(e) Date: Aug. 8, 1995

[87] PCT Pub. No.: WO95/17734

PCT Pub. Date: Jun. 29, 1995

[30] Foreign Application Priority Data

Dec. 21, 1993 [JP] Japan .................... 5-344690

[51] Int. Cl.$^6$ ........................................ G06K 9/00
[52] U.S. Cl. ............................ 382/190; 382/224
[58] Field of Search ................... 382/165, 159, 382/173, 181, 182, 183, 184, 185, 155, 186, 187, 267, 190, 311, 191, 280, 192, 197, 156, 193, 194, 195, 199, 201, 202, 203, 204, 205, 209, 217, 218, 219, 220, 221, 224, 225, 227, 228, 229, 230, 231, 282, 283; 395/2.09

[56] References Cited

U.S. PATENT DOCUMENTS

| | | | |
|---|---|---|---|
| 5,182,777 | 1/1993 | Nakayama et al. | 382/18 |
| 5,255,342 | 10/1993 | Nitta | 395/2 |
| 5,293,429 | 3/1994 | Pizano et al. | 382/24 |
| 5,315,668 | 5/1994 | O'Hair | 382/14 |

FOREIGN PATENT DOCUMENTS

| | | | |
|---|---|---|---|
| 63-75989A | 4/1988 | Japan | G06K 9/62 |
| 63-106088A | 5/1988 | Japan | G06K 9/46 |
| 63-234372A | 9/1988 | Japan | G06K 9/46 |

*Primary Examiner*—Leo Boudreau
*Assistant Examiner*—Bijan Tadayon
*Attorney, Agent, or Firm*—Townsend and Townsend and Crew LLP

[57] ABSTRACT

A method of pattern recognition, including the steps of: (a) creating N subregions by dividing a recognition region of an input pattern into N blocks and assigning corresponding subregion numbers to the N blocks; (b) constructing a feature vector having N features as elements by calculating a feature for each of the N subregions in accordance with a prescribed criterion; (c) constructing a total of (N−1) feature sets by retrieving the largest or smallest of the N elements of the feature vector to construct a first feature set consisting of one subregion number corresponding to the retrieved element, then retrieving the two largest or two smallest elements to construct a second feature set consisting of a combination of two subregion numbers corresponding to the two retrieved elements, and so forth; and (d) by reference to a dictionary in which feature sets obtained by performing the steps (a) to (c) on various kinds of model patterns are prerecorded along with category names of the model patterns, obtaining similarities between the feature sets of the input pattern and the feature sets stored in the dictionary in corresponding relationship to the category names, and determining the category name that provides the greatest similarity, as the category name of the input pattern.

9 Claims, 27 Drawing Sheets

Fig. 3A
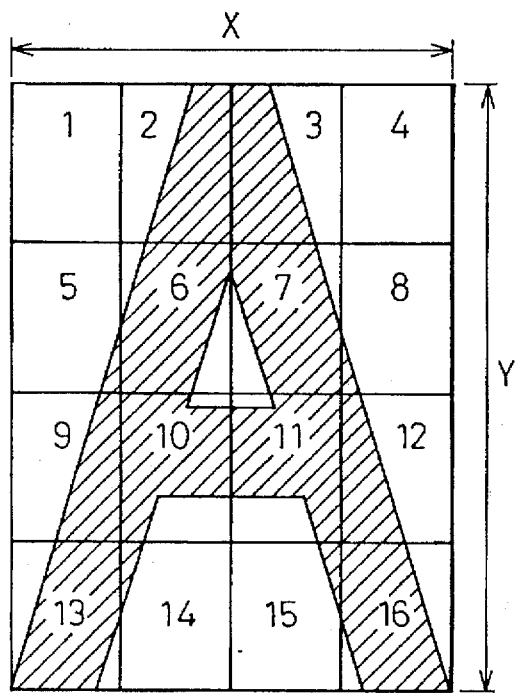
Fig. 3B
Fig. 3C
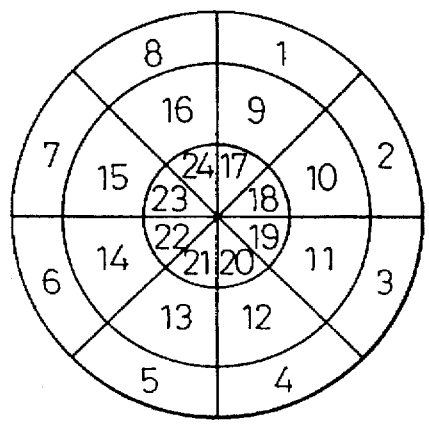

Fig.4A

| (1) 5000 | (2) 100 |
|---|---|
| (3) 200 | (4) -10 |

Fig.4B

| (1) 30 | (2) 29 |
|---|---|
| (3) 28 | (4) 27 |

Fig.4C

| (1) -3 | (2) -2 |
|---|---|
| (3) -1 | (4) -4 |

Fig. 5

| FEATURE SET | CATEGORY NAME |
|---|---|
| {1} | A |
| {2} | A |
| {3} | A,B |
| {4} | A,B |
| {6} | B |
| {1,2} | A |
| {1,3} | A |
| {2,3} | A |
| {3,4} | B |
| {4,5} | A |
| {5,6} | B |
| {1,2,3} | A |
| {3,4,5} | B |
| {3,4,6} | B |
| {4,5,6} | A,B |
| {1,2,3,4} | A |
| {1,2,3,5} | A |
| {1,2,3,6} | A |
| {1,4,5,6} | A |
| {3,4,5,6} | B |
| {1,2,3,4,5} | A |
| {1,2,3,4,6} | A |
| {1,2,3,5,6} | A |
| {1,2,4,5,6} | A |
| {1,3,4,5,6} | B |
| {2,3,4,5,6} | B |

Fig.14A

| 1 | 1 | 1 | 1 | 1 | 1 | 1 | 1 |
|---|---|---|---|---|---|---|---|
| 1 | 1 | 1 | 1 | 1 | 1 | 1 | 1 |
| 1 | 1 | 1 | 1 | 1 | 1 | 1 | 1 |
| 0 | 0 | 0 | 1 | 1 | 1 | 0 | 0 |
| 0 | 0 | 0 | 1 | 1 | 1 | 0 | 0 |
| 0 | 0 | 0 | 1 | 1 | 1 | 0 | 0 |
| 0 | 0 | 0 | 1 | 1 | 1 | 0 | 0 |
| 0 | 0 | 0 | 1 | 1 | 1 | 0 | 0 |
| 0 | 0 | 0 | 1 | 1 | 1 | 0 | 0 |
| 0 | 0 | 0 | 1 | 1 | 1 | 0 | 0 |

Fig.14B

| 16 | 16 | 16 | 16 | 16 | 16 | 16 | 16 |
|----|----|----|----|----|----|----|----|
| 16 | 16 | 16 | 16 | 16 | 16 | 16 | 16 |
| 16 | 16 | 16 | 16 | 16 | 16 | 16 | 16 |
| 0 | 0 | 0 | 16 | 16 | 16 | 0 | 0 |
| 0 | 0 | 0 | 16 | 16 | 16 | 0 | 0 |
| 0 | 0 | 0 | 16 | 16 | 16 | 0 | 0 |
| 0 | 0 | 0 | 16 | 16 | 16 | 0 | 0 |
| 0 | 0 | 0 | 16 | 16 | 16 | 0 | 0 |
| 0 | 0 | 0 | 16 | 16 | 16 | 0 | 0 |
| 0 | 0 | 0 | 16 | 16 | 16 | 0 | 0 |

Fig.14C

| 16 | 16 | 16 | 16 | 16 | 16 | 16 | 16 |
|----|----|----|----|----|----|----|----|
| 16 | 16 | 16 | 16 | 16 | 16 | 16 | 16 |
| 16 | 16 | 16 | 16 | 16 | 16 | 16 | 16 |
| 15 | 15 | 15 | 16 | 16 | 16 | 15 | 15 |
| 0 | 0 | 15 | 16 | 16 | 16 | 15 | 0 |
| 0 | 0 | 15 | 16 | 16 | 16 | 15 | 0 |
| 0 | 0 | 15 | 16 | 16 | 16 | 15 | 0 |
| 0 | 0 | 15 | 16 | 16 | 16 | 15 | 0 |
| 0 | 0 | 15 | 16 | 16 | 16 | 15 | 0 |
| 0 | 0 | 15 | 16 | 16 | 16 | 15 | 0 |

Fig.14D

| 16 | 16 | 16 | 16 | 16 | 16 | 16 | 16 |
|----|----|----|----|----|----|----|----|
| 16 | 16 | 16 | 16 | 16 | 16 | 16 | 16 |
| 16 | 16 | 16 | 16 | 16 | 16 | 16 | 16 |
| 15 | 15 | 15 | 16 | 16 | 16 | 15 | 15 |
| 14 | 14 | 15 | 16 | 16 | 16 | 15 | 14 |
| 13 | 14 | 15 | 16 | 16 | 16 | 15 | 14 |
| 13 | 14 | 15 | 16 | 16 | 16 | 15 | 14 |
| 13 | 14 | 15 | 16 | 16 | 16 | 15 | 14 |
| 13 | 14 | 15 | 16 | 16 | 16 | 15 | 14 |
| 13 | 14 | 15 | 16 | 16 | 16 | 15 | 14 |

Fig.14E

| 16 | 16 | 16 | 16 | 16 | 16 | 16 | 16 |
|----|----|----|----|----|----|----|----|
| 16 | 17 | 17 | 17 | 17 | 17 | 17 | 16 |
| 16 | 16 | 16 | 17 | 17 | 17 | 16 | 16 |
| 15 | 15 | 15 | 16 | 17 | 17 | 16 | 15 |
| 14 | 14 | 15 | 16 | 17 | 17 | 16 | 15 | 14 |
| 13 | 14 | 15 | 16 | 17 | 17 | 16 | 15 | 14 |
| 13 | 14 | 15 | 16 | 17 | 17 | 16 | 15 | 14 |
| 13 | 14 | 15 | 16 | 17 | 17 | 16 | 15 | 14 |
| 13 | 14 | 15 | 16 | 17 | 17 | 16 | 15 | 14 |
| 13 | 14 | 15 | 16 | 16 | 16 | 16 | 15 | 14 |

Fig.14F

| 16 | 16 | 16 | 16 | 16 | 16 | 16 | 16 |
|----|----|----|----|----|----|----|----|
| 16 | 17 | 17 | 17 | 17 | 17 | 17 | 16 |
| 16 | 16 | 16 | 17 | 18 | 18 | 17 | 16 |
| 15 | 15 | 15 | 16 | 17 | 17 | 16 | 15 |
| 14 | 14 | 15 | 16 | 17 | 17 | 16 | 15 | 14 |
| 13 | 14 | 15 | 16 | 17 | 17 | 16 | 15 | 14 |
| 13 | 14 | 15 | 16 | 17 | 17 | 16 | 15 | 14 |
| 13 | 14 | 15 | 16 | 17 | 17 | 16 | 15 | 14 |
| 13 | 14 | 15 | 16 | 17 | 17 | 16 | 15 | 14 |
| 13 | 14 | 15 | 16 | 16 | 16 | 16 | 15 | 14 |

Fig.15

| 1 1 1 1 1 1 1 1 1 | 1 1 1 1 | 1 1 1 1 1 1 1 1 1 1 |
|---|---|---|
| 1 1 1 1 1 1 1 1 1 | 1 1 1 1 | 1 1 1 1 1 1 1 1 1 1 |
| 1 1 1 1 1 1 1 1 1 | 1 1 1 1 | 1 1 1 1 1 1 1 1 1 1 |
| 1 1 1 1 1 1 1 1 1 | 1 1 1 1 | 1 1 1 1 1 1 1 1 1 1 |
| 1 1 1 1 1 1 1 1 1 | 1 1 1 1 | 1 1 1 1 1 1 1 1 1 1 |
| 0 0 0 0 0 0 0 0 0 0 | 1 1 1 1 1 | 0 0 0 0 0 0 0 0 0 0 |
| 0 0 0 0 0 0 0 0 0 0 | 1 1 1 1 1 | 0 0 0 0 0 0 0 0 0 0 |
| 0 0 0 0 0 0 0 0 0 0 | 1 1 1 1 1 | 0 0 0 0 0 0 0 0 0 0 |
| 0 0 0 0 0 0 0 0 0 0 | 1 1 1 1 1 | 0 0 0 0 0 0 0 0 0 0 |
| 0 0 0 0 0 0 0 0 0 0 | 1 1 1 1 1 | 0 0 0 0 0 0 0 0 0 0 |
| 0 0 0 0 0 0 0 0 0 0 | 1 1 1 1 1 | 0 0 0 0 0 0 0 0 0 0 |
| 0 0 0 0 0 0 0 0 0 0 | 1 1 1 1 1 | 0 0 0 0 0 0 0 0 0 0 |
| 0 0 0 0 0 0 0 0 0 0 | 1 1 1 1 1 | 0 0 0 0 0 0 0 0 0 0 |
| 0 0 0 0 0 0 0 0 0 0 | 1 1 1 1 1 | 0 0 0 0 0 0 0 0 0 0 |
| 0 0 0 0 0 0 0 0 0 0 | 1 1 1 1 1 | 0 0 0 0 0 0 0 0 0 0 |
| 0 0 0 0 0 0 0 0 0 0 | 1 1 1 1 1 | 0 0 0 0 0 0 0 0 0 0 |
| 0 0 0 0 0 0 0 0 0 0 | 1 1 1 1 1 | 0 0 0 0 0 0 0 0 0 0 |
| 0 0 0 0 0 0 0 0 0 0 | 1 1 1 1 1 | 0 0 0 0 0 0 0 0 0 0 |
| 0 0 0 0 0 0 0 0 0 0 | 1 1 1 1 1 | 0 0 0 0 0 0 0 0 0 0 |
| 0 0 0 0 0 0 0 0 0 0 | 1 1 1 1 1 | 0 0 0 0 0 0 0 0 0 0 |
| 0 0 0 0 0 0 0 0 0 0 | 1 1 1 1 1 | 0 0 0 0 0 0 0 0 0 0 |
| 0 0 0 0 0 0 0 0 0 0 | 1 1 1 1 1 | 0 0 0 0 0 0 0 0 0 0 |
| 0 0 0 0 0 0 0 0 0 0 | 1 1 1 1 1 | 0 0 0 0 0 0 0 0 0 0 |
| 0 0 0 0 0 0 0 0 0 0 | 1 1 1 1 1 | 0 0 0 0 0 0 0 0 0 0 |

|  |  |  | 0 |  |  |  |  |  |  |  | 1 |  |  | ←I/X |
|---|---|---|---|---|---|---|---|---|---|---|---|---|---|---|
|  |  | 0 | 1 | 2 | 3 | 4 | 5 | 6 | 7 | 8 | ←I/VX | | | |
|  |  | 0 1 | 2 3 | 4 5 | 6 7 | 8 9 | 10 11 | 12 13 | 14 15 | 16 17 | ←I | | | |
| 0 | 0 | 0 | 16 16 | 16 16 | 16 16 | 16 16 | 16 16 | 16 16 | 16 16 | 16 16 | 16 16 |
|  |  | 1 | 16 16 | 16 16 | 16 16 | 16 16 | 16 16 | 16 16 | 16 16 | 16 16 | 16 16 |
|  |  | 2 | 16 16 | 16 16 | 16 16 | 16 16 | 16 16 | 16 16 | 16 16 | 16 16 | 16 16 |
|  | 1 | 3 | 16 16 | 17 17 | 17 17 | 17 17 | 17 17 | 17 17 | 17 17 | 17 17 | 16 16 |
|  |  | 4 | 16 16 | 17 17 | 17 17 | 17 17 | 17 17 | 17 17 | 17 17 | 17 17 | 16 16 |
|  |  | 5 | 16 16 | 17 17 | 17 17 | 17 17 | 17 17 | 17 17 | 17 17 | 17 17 | 16 16 |
|  | 2 | 6 | 16 16 | 16 16 | 16 16 | 17 17 | 18 18 | 18 18 | 17 17 | 16 16 | 16 16 |
|  |  | 7 | 16 16 | 16 16 | 16 16 | 17 17 | 18 18 | 18 18 | 17 17 | 16 16 | 16 16 |
|  |  | 8 | 16 16 | 16 16 | 16 16 | 17 17 | 18 18 | 18 18 | 17 17 | 16 16 | 16 16 |
|  | 3 | 9 | 15 15 | 15 15 | 15 15 | 16 16 | 17 17 | 17 17 | 16 16 | 15 15 | 15 15 |
|  |  | 10 | 15 15 | 15 15 | 15 15 | 16 16 | 17 17 | 17 17 | 16 16 | 15 15 | 15 15 |
|  |  | 11 | 15 15 | 15 15 | 15 15 | 16 16 | 17 17 | 17 17 | 16 16 | 15 15 | 15 15 |
|  | 4 | 12 | 14 14 | 14 14 | 15 15 | 16 16 | 17 17 | 17 17 | 16 16 | 15 15 | 14 14 |
|  |  | 13 | 14 14 | 14 14 | 15 15 | 16 16 | 17 17 | 17 17 | 16 16 | 15 15 | 14 14 |
|  |  | 14 | 14 14 | 14 14 | 15 15 | 16 16 | 17 17 | 17 17 | 16 16 | 15 15 | 14 14 |
| 1 | 5 | 15 | 13 13 | 14 14 | 15 15 | 16 16 | 17 17 | 17 17 | 16 16 | 15 15 | 14 14 |
|  |  | 16 | 13 13 | 14 14 | 15 15 | 16 16 | 17 17 | 17 17 | 16 16 | 15 15 | 14 14 |
|  |  | 17 | 13 13 | 14 14 | 15 15 | 16 16 | 17 17 | 17 17 | 16 16 | 15 15 | 14 14 |
|  | 6 | 18 | 13 13 | 14 14 | 15 15 | 16 16 | 17 17 | 17 17 | 16 16 | 15 15 | 14 14 |
|  |  | 19 | 13 13 | 14 14 | 15 15 | 16 16 | 17 17 | 17 17 | 16 16 | 15 15 | 14 14 |
|  |  | 20 | 13 13 | 14 14 | 15 15 | 16 16 | 17 17 | 17 17 | 16 16 | 15 15 | 14 14 |
|  | 7 | 21 | 13 13 | 14 14 | 15 15 | 16 16 | 17 17 | 17 17 | 16 16 | 15 15 | 14 14 |
|  |  | 22 | 13 13 | 14 14 | 15 15 | 16 16 | 17 17 | 17 17 | 16 16 | 15 15 | 14 14 |
|  |  | 23 | 13 13 | 14 14 | 15 15 | 16 16 | 17 17 | 17 17 | 16 16 | 15 15 | 14 14 |
|  | 8 | 24 | 13 13 | 14 14 | 15 15 | 16 16 | 17 17 | 17 17 | 16 16 | 15 15 | 14 14 |
|  |  | 25 | 13 13 | 14 14 | 15 15 | 16 16 | 17 17 | 17 17 | 16 16 | 15 15 | 14 14 |
|  |  | 26 | 13 13 | 14 14 | 15 15 | 16 16 | 17 17 | 17 17 | 16 16 | 15 15 | 14 14 |
| 2 | 9 | 27 | 13 13 | 14 14 | 15 15 | 16 16 | 17 17 | 17 17 | 16 16 | 15 15 | 14 14 |
|  |  | 28 | 13 13 | 14 14 | 15 15 | 16 16 | 17 17 | 17 17 | 16 16 | 15 15 | 14 14 |
|  |  | 29 | 13 13 | 14 14 | 15 15 | 16 16 | 17 17 | 17 17 | 16 16 | 15 15 | 14 14 |
|  | 10 | 30 | 13 13 | 14 14 | 15 15 | 16 16 | 16 16 | 16 16 | 16 16 | 15 15 | 14 14 |
|  |  | 31 | 13 13 | 14 14 | 15 15 | 16 16 | 16 16 | 16 16 | 16 16 | 15 15 | 14 14 |
|  |  | 32 | 13 13 | 14 14 | 15 15 | 16 16 | 16 16 | 16 16 | 16 16 | 15 15 | 14 14 |

FEATURE VECTOR V

| [0] 1607 | [1] 1627 |
|---|---|
| [2] 1475 | [3] 1553 |
| [4] 1460 | [5] 1542 |

METHOD OF AND APPARATUS FOR PATTERN RECOGNITION AND METHOD OF CREATING PATTERN RECOGNITION DICTIONARY

TECHNICAL FIELD

1. Background of the Invention

The present invention relates to a method of and an apparatus for recognizing input characters and various different input patterns by referencing a prescribed dictionary, and also relates to a method of creating a pattern recognition dictionary used in the same.

2. Background Art

Generally, pattern recognition for recognizing letters, numbers, patterns, etc., is performed by comparing an input pattern with the contents of a dictionary in which standard patterns are stored in advance. Pattern recognition, therefore, has an inherent problem that as the kinds of letters, numbers, patterns, etc., to be recognized increase, the size of the dictionary for storing them becomes large, and the time of the recognition process increases proportionally. Hence, there arises a need to reduce the time required for pattern recognition.

The prior art discloses a variety of pattern recognition methods, including a method based on pattern matching, a method based on feature extraction, etc. In the method based on pattern matching, for example, printed characters, handwritten characters, etc., are optically read by a scanner or the like; each input character is then matched against a plurality of standard patterns stored in a pattern recognition dictionary, and the name of the standard pattern that has the greatest similarity is selected as the name of the input pattern.

In the method based on feature extraction, for example, a dictionary is created in advance in which the vertical and horizontal distributions of character parts, the relations between character elements and their neighbors, etc., are recorded as character features; to identify a captured character, its features are extracted and compared with those of the recorded characters, and the character having the features that provide the greatest similarity is determined as being equivalent to the captured character.

A pattern recognition method using a neurocomputer is also known. In this type of pattern recognition method, there are provided, for example, an input layer, which consists of neurons corresponding to the dots forming the two-dimensional patterns of letters, numerals, various pattern, etc., to be recognized, an output layer, which consists of neurons corresponding to recognition outputs, and an intermediate layer, which provides weighted connections between them; the weighting in the intermediate layer is adjusted using a back propagation method, etc., and, upon completion of learning, the output layer outputs the result of the recognition, such as a pattern name, for the pattern input to the input layer.

The prior art method of recognition using pattern matching requires that preprocessing be performed to normalize the size, position, etc., of an input pattern to those of the standard patterns stored in the dictionary, and also that the input pattern be matched against all the standard patterns stored in the dictionary, and hence, has a shortcoming that an appreciable time is spent in preprocessing and pattern matching.

On the other hand, in the method of recognition using feature extraction, comparison must be made of all the features of the character to be recognized, and the number of features of letters, numerals, and patterns becomes enormous. This presents a problem in that the dictionary size becomes very large if a high recognition rate is to be obtained, and hence there is a shortcoming that the recognition time increases.

Furthermore, in the case of material containing letters, numbers, etc., of different type styles such as gothic and italic, along with standard patterns, pattern matching or extraction and comparison of features needs to be performed for each type style, which means that the same number of matching or comparison operations as the number of type styles must be performed for one character name, requiring a considerable time for recognition. Instead of a method requiring successive comparisons, a method using a technique of broad classification to limit the kinds of patterns to be recognized is under study, but optimum means that can implement the broad classification method without reducing the recognition rate is not yet realized.

The pattern recognition method using a neurocomputer, on the other hand, requires that learning be repeated ten to several thousand times, and also the number of recognizable patterns is limited. This method, therefore, is not commercially implemented at present.

In view of the above situation, it is an object of the present invention to provide a method of and an apparatus for pattern recognition and a method of creating a dictionary, which achieve a reduction in the time required for dictionary creation, a reduction in recognition time even for material containing characters of different type styles, and an improvement in recognition rate. It is another object of the invention to enable similarities to be obtained for all categories in recognition processing.

SUMMARY OF THE INVENTION

The invention provides a method of pattern recognition, comprising the steps of: (a) creating N subregions by dividing a recognition region of an input pattern into N blocks and assigning corresponding subregion numbers to the N blocks; (b) constructing a feature vector having N features as elements by calculating a feature for each of the N subregions in accordance with a prescribed criterion; (c) constructing a total of (N–1) feature sets by retrieving the largest or smallest of the N elements of the feature vector to construct a first feature set consisting of one subregion number corresponding to the retrieved element, then retrieving the two largest or two smallest elements to construct a second feature set consisting of a combination of two subregion numbers corresponding to the two retrieved elements, and so forth, until constructing the (N–1)th feature set consisting of a combination of (N–1) subregion numbers; and (d) by reference to a dictionary in which feature sets obtained by performing the steps (a) to (c) on various kinds of model patterns are prerecorded along with category names of the model patterns, obtaining similarities between the feature sets of the input pattern and the feature sets stored in the dictionary in corresponding relationship to the category names, and determining the category name that provides the greatest similarity, as the category name of the input pattern.

The invention also provides an apparatus for pattern recognition, comprising: pattern input means for inputting a pattern to be recognized; means for creating N subregions by dividing a recognition region of the input pattern into N blocks and assigning corresponding subregion numbers to the N blocks; means for constructing a feature vector having N features as elements by calculating a feature for each of the N subregions in accordance with a prescribed criterion; means for constructing a total of (N−1) feature sets by retrieving the largest or smallest of the N elements of the feature vector to construct a first feature set consisting of one subregion number corresponding to the retrieved element, then retrieving the two largest or two smallest elements to construct a second feature set consisting of a combination of two subregion numbers corresponding to the two retrieved elements, and so forth, until constructing the (N−1)th feature set consisting of a combination of (N−1) subregion numbers; means for storing a dictionary in which feature sets obtained through processing performed on various kinds of model patterns by the pattern input means, the subregion creating means, the feature vector constructing means, and the feature set constructing means, are prerecorded along with category names of the model patterns; and means for obtaining similarities between the feature sets of the input pattern and the feature sets stored in the dictionary in corresponding relationship to the category names, and for determining the category name that provides the greatest similarity, as the category name of the input pattern.

The invention also provides a method of creating a pattern recognition dictionary, comprising the steps of: (a) creating N subregions by dividing a recognition region of an input model pattern into N blocks and assigning corresponding subregion numbers to the N blocks; (b) constructing a feature vector having N features as elements by calculating a feature for each of the N subregions in accordance with a prescribed criterion; (c) constructing a total of (N−1) feature sets by retrieving the largest or smallest of the N elements of the feature vector to construct a first feature set consisting of one subregion number corresponding to the retrieved element, then retrieving the two largest or two smallest elements to construct a second feature set consisting of a combination of two subregion numbers corresponding to the two retrieved elements, and so forth, until constructing the (N−1)th feature set consisting of a combination of (N−1) subregion numbers; and (d) storing the feature sets in a designated memory by associating each of the feature sets with a category name of the model pattern.

BRIEF DESCRIPTION OF THE DRAWINGS

FIGS. 3A, 3B, and 3C are diagrams for explaining feature vector extraction;

FIGS. 4A, 4B, and 4C are diagrams for explaining feature vectors in simplified form;

FIG. 5 is a diagram for explaining a pattern recognition dictionary;

FIGS. 14A, 14B, 14C, 14D, 14E, and 14F are diagrams showing how a pattern is transformed by weighting;

FIG. 15 is a diagram showing an example of an input pattern;

FIG. 16 is a diagram showing a pattern obtained after applying weightings to the input pattern shown in FIG. 15;

FIG. 17 is a diagram for explaining the values of dots distributed among subregions of the pattern shown in FIG. 14F in connection with a process of counting the dots within each subregion;

FIG. 18 is a diagram showing a feature vector obtained as a result of dot counting on the dot distribution shown in FIG. 17;

DESCRIPTION OF THE PREFERRED EXEMPLARY EMBODIMENTS

A detailed description of the invention will now be given below with reference to the accompanying drawings.

Figure 1:
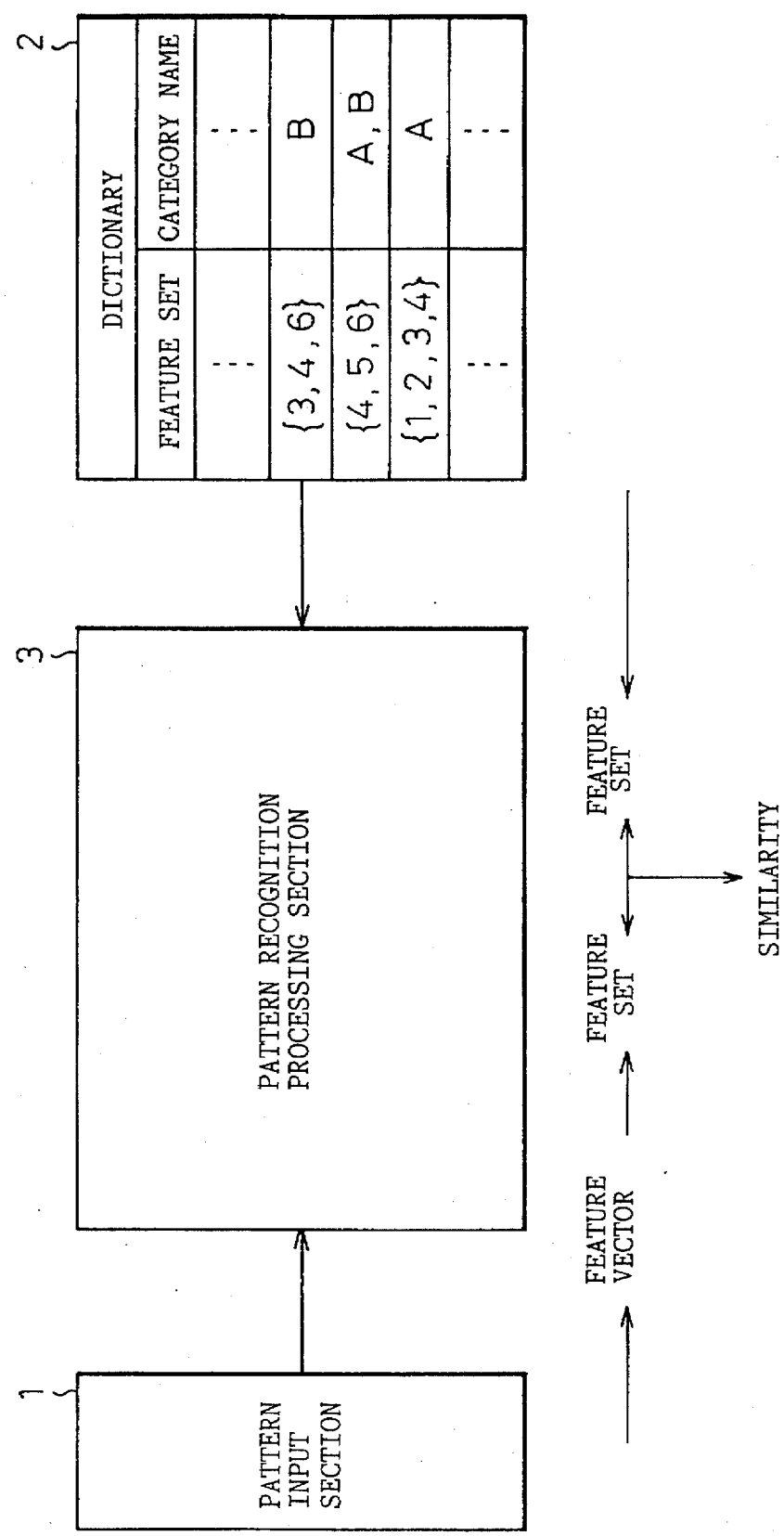
FIG. 1 is a diagram for explaining the principle of the present invention.

FIG. 1 is a diagram for explaining the principle of the present invention. Basically, the pattern recognition apparatus of the invention consists of a pattern input section 1, a pattern recognition dictionary 2, and a pattern recognition processing section 3, as shown in the figure. The pattern input section 1 is constructed from a scanner capable of reading patterns or from a memory in which image data are stored. The pattern recognition dictionary 2 consists of a memory in which feature sets obtained from character names, such as katakana, hiragana, and kanji, number names, and pattern names such as asterisk, are stored by associating them with their category names. For different type styles belonging to the same category name, feature sets obtained from a plurality of model patterns may be stored in the dictionary 2. If such model patterns need not be added, the dictionary 2 may be constructed from a read-only memory (ROM). The pattern recognition processing section 3, using the processing functions of a microprocessor or the like, derives feature sets from the input pattern input from the pattern input section 1 by a process similar to the process of creating the dictionary 2, obtains similarities between the feature sets of the input pattern and the feature sets stored in the dictionary 2 in a corresponding relationship with their associated category names, and determines the category name that gives the greatest similarity, as the category name of the input pattern.

Figure 2:
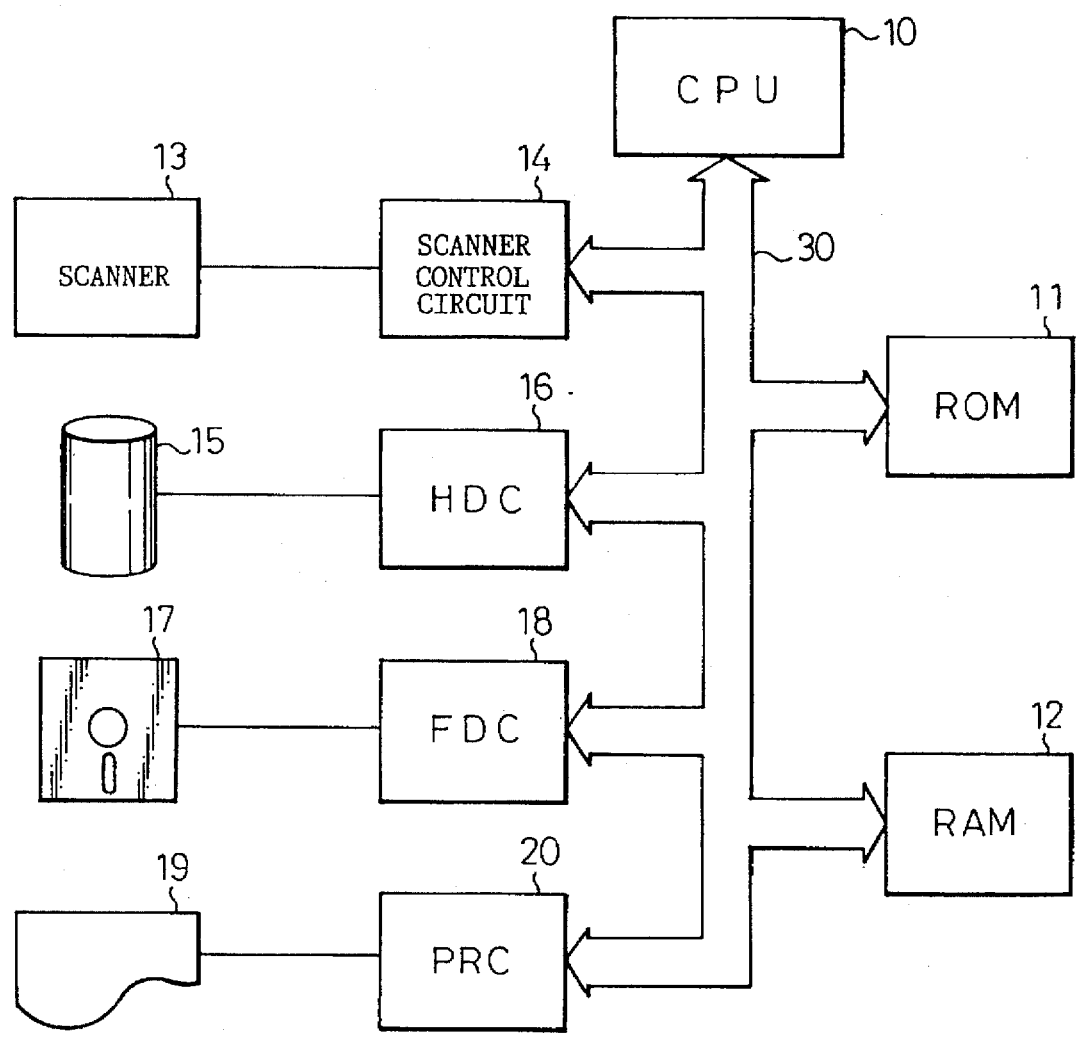
FIG. 2 is a diagram showing the hardware configuration of a pattern recognition apparatus according to one embodiment of the present invention.

FIG. 2 is a block diagram showing the hardware configuration of a pattern recognition apparatus according to one embodiment of the invention. In the figure, reference numeral 10 is a CPU consisting of a general-purpose microprocessor; 11 is a ROM for storing programs for the CPU 10 as well as a pattern recognition dictionary; 12 is a RAM for storing temporary data during the calculation and control operations of the CPU 10; 13 is a scanner equipped with optical means for scanning a pattern to be recognized; 14 is a control circuit for controlling the scanner; 15 is a hard disk unit for saving a pattern recognition dictionary, pattern recognition results, etc., in files; 16 is a control circuit for controlling the hard disk unit; 17 is a flexible disk unit for saving such files; 18 is a control circuit for controlling the flexible disk unit; 19 is a printer for printing out pattern recognition results, etc.; and 20 is a control circuit for controlling the printer. The CPU 10, ROM 11, RAM 12, and control circuits, 14, 16, 18, and 20, are interconnected by a system bus 30.

A description will now be given of the pattern recognition dictionary. To create this dictionary, feature sets are derived from model patterns input via the pattern scanner 13, for example, and these feature sets are stored in a memory (for example, the ROM 11) by associating them with category names such as character names, number names, and pattern names. Such feature sets can be obtained from a feature vector. The feature vector is constructed by dividing the recognition region of a model pattern into N subregions of equal area size or equal dot count; the dot count or area size of each subregion is an element of the feature vector, or alternatively, the same number, N, of other features are obtained from the model pattern, each feature then forming an element of the feature vector. The feature vector V can be expressed as $$V=\{v_1, v_2, v_3, \ldots, v_i, \ldots, v_N\} \quad (1)$$

Then, I elements (I=1 to N−1) are sequentially selected from the elements $v_1$-$v_N$ of the feature vector V in descending or ascending order of the elements. A set of elements representing the positions on the vector of the I selected elements (these positions coincide with the subregion numbers) is called a feature set $T_1$. With I=1 to N−1, (N−1) feature sets are constructed. These (N−1) feature $T_I$ sets are arranged in ascending order of I to construct a feature set sequence consisting of $T_1, T_2, \ldots, T_{N-1}$. For example, assuming that in equation (1) the elements are arranged in decreasing order of magnitude, that is, the magnitude decreases in the order of $v_1, v_2, v_3, \ldots, v_N$, then the feature set for I=1 is {1}, the feature set for I=2 is {1, 2}, the feature set for I=3 is {1, 2, 3}, and so on, the final feature set for I=N−1 being {1, 2, 3, ..., N−1}. A total of (N−1) feature sets are obtained in this manner. The pattern recognition dictionary is created by storing each feature set in memory by associating it with the category name of the model pattern.

For the letter "A" shown in FIG. 3A, for example, if the recognition region consisting of X dots×Y dots is divided into quarters in both vertical and horizontal directions, a total of 16 subregions of equal area size are obtained. Subregion numbers 1–16 are assigned to the respective subregions, and the number of black dots in each subregion is calculated, each black dot forming part of the letter area. Denoting these calculated values as $v_1$-$v_{16}$, the feature vector V expressed by equation (1) is obtained. Then, I elements (I=1 to N−1) are sequentially selected from the elements, $v_1$-$v_{16}$, in decreasing order of value. Next, feature sets $T_I$(I=1 to N−1), each with elements representing I subregion numbers corresponding to the I selected vector elements, are obtained. These feature sets are arranged in ascending order of I to construct a feature set sequence, $T_1$-$T_{N-1}$(=$T_1$-$T_{15}$). For the letter "A", when the subregion numbers 1 to 16 are arranged in decreasing order of black dot counts, if the result is 6, 7, 10, 11, 13, 16, 2, 3, 9, 12, 5, 8, 14, 15, 1, 4 then, the feature set sequence, $T_1$-$T_{15}$, is given as $T_1 = \{6\}$
$T_2 = \{6, 7\}$
$T_3 = \{6, 7, 10\}$
$T_4 = \{6, 7, 10, 11\}$
$T_5 = \{6, 7, 10, 11, 13\}$
.
.
.
$T_{15} = \{1, 2, 3, 5, 6, 7, 8, 9, 10, 11, 12, 13, 14, 15, 16\}$ These feature sets are stored in memory by associating them with the category name A.

FIG. 3B shows an example in which the recognition region is first divided vertically into blocks of equal black dot count, and then each block is divided horizontally into subblocks of equal black dot count, the resulting subregions being assigned subregion numbers 1–20. When the area sizes of the subregions are denoted by $v_1$-$v_{20}$, respectively, the feature vector expressed by equation (1) is obtained. Then, I elements (I=1 to N−1) are sequentially selected in decreasing or increasing order of area size. Next, feature sets $T_I$(I=1 to N−1), each with elements representing I subregion numbers corresponding to the I selected vector elements, are obtained. These feature sets are arranged in ascending order of I to construct a feature set sequence, $T_1$-$T_{N-1}$ (=$T_1$-$T_{19}$).

FIG. 3C shows an example in which the pattern recognition region is divided by concentric circles and radial lines. In this example, the number of black dots in each subregion is counted, and of the outermost eight subregions, the subregion having the largest count value is assigned a subregion number 1, starting from which subregion numbers 2 to 24 are assigned in sequence, counting the number of black dots in each subregion and thus constructing a feature vector consisting of 24 elements. Then, 1, 2, ..., 23 feature vector elements are sequentially selected in decreasing or increasing order of the count value. Next, feature sets $T_I$(I=1 to N−1), each with elements representing I subregion numbers corresponding to the I selected vector elements, are obtained. These feature sets are arranged in ascending order of I to construct a feature set sequence, $T_1$-$T_{N-1}$(=$T_1$-$T_{23}$). This method can also be applied to recognition of various patterns.

Next, a process of dot weighting will be described. In FIG. 3A, denoting the horizontal dot count as X and the vertical dot count as Y, the pattern recognition region of X×Y (dots) is defined using $$f(x,y)_z \in \{0, 1\} \quad (2)$$

where $0 \leq x < X$, $0 \leq y < Y$, and x and y are integers.
Hence, the function f(x,y) represents a lattice point.
Further, equation (2) is extended to real numbers to define as $$f(x,y)_R \in \{0, 1\} \quad (3)$$

where $0 \leq x < X$, $0 \leq y < Y$, and x and y are real numbers.
Hence, the function f(x,y) also represents a point between lattice points.

Assuming that a point (x,y) is a contour point, a point (x',y') for which f(x,y)≠f(x',y') exists very close to the point (x,y). That is, for very close points (x,y) and (x',y'), a point for which f(x,y)≠f(x',y') is a contour point.

Further, when the distance from the point (x,y) to its nearest contour point is denoted by d(x,y,f), and intervals [0, X) and [0, Y) are equally divided into $n_x$ and $n_y$, respectively, to form $n_x \times n_y$=N subregions, the elements $v_i$ of the feature vector V can be expressed as $$v_i = \int \int_{R_i} (2 \cdot f(x,y) - 1) \times d(x,y,f) dx dy \quad (4)$$

where Ri represents a rectangular subregion, and $$\int \int_{R_i} (\ ) dx dy$$

indicates the surface integral of the rectangular subregion. Further, $1 \leq i \leq N$.

Since f(x,y) is either 0 or 1, (2·f(x,y)−1) in equation (4) is 1 when f(x,y)=1, and −1 when f(x,y)=0. That is, equation (4) is used to obtain the elements $v_i$ of the feature vector V by assigning weights according to the distance from the closest contour point. Then, the feature vector V is obtained, and I elements (I=1 to N−1) are sequentially selected in decreasing or increasing order of the elements $v_i$, in the same manner as earlier described. Next, feature sets $T_i$(I=1 to N−1), each with elements representing I subregion numbers corresponding to the I selected vector elements, are obtained. These vector sets are arranged in ascending order of I to construct a feature set sequence, $T_1 - T_{N-1}$.

FIGS. 4A, 4B, and 4C are diagrams for explaining feature vectors in simplified form, each diagram showing the elements of a feature vector V of dimension N=4. Numbers (1) to (4) in each figure indicate the subregion numbers. Denoting the feature vectors shown in FIGS. 4A, 4B, and 4C as Va, Vb, and Vc, respectively, the following are given.

Va=(5000, 100, 200, −10)

Vb=(30, 29, 28, 27)

Vc=(−3, −2, −1, −4)

One to N−1 elements, i.e, one, two, and three elements, are sequentially selected from the elements of the feature vector Va in decreasing order, to obtain feature sets $Ta_1$, $Ta_2$, and $Ta_3$ as follows.

$Ta_1$={1}

$Ta_2$={1, 3}

$Ta_3$={1, 2, 3}

Likewise, feature sets are obtained from the feature vector Vb, which are given as $Tb_1$={1}

$Tb_2$={1, 2}

$Tb_3$={1, 2, 3}

Further, feature sets are obtained from the feature vector Vc, which are given as $Tc_1$={3}

$Tc_2$={2, 3}

$Tc_3$={1, 2, 3}

Next, for category names "A" and "B", for example, four kinds of model patterns of multiple kinds of printed characters, handwritten characters, etc., are input, the recognition region is divided into six subregions (i.e., the dimension of the feature vector is 6) and the number of dots in each of the six subregions No. 1 to No. 6 is calculated. Suppose here that the results are given as follows.

| Region No. | 1 | 2 | 3 | 4 | 5 | 6 |
|---|---|---|---|---|---|---|
| VA1 = | ( 100, | 90, | 80, | 70, | 60, | 50) |
| VA2 = | ( 40, | 50, | 45, | 33, | 35, | 34) |
| VA3 = | (1980, | 12, | 2000, | 1, | 0, | 2) |
| VA4 = | ( 96, | 95, | 94, | 99, | 98, | 97) |
| VB1 = | ( 24, | 22, | 30, | 32, | 28, | 26) |
| VB2 = | ( 24, | 22, | 64, | 60, | 52, | 56) |
| VB3 = | ( 154, | 155, | 175, | 174, | 165, | 164) |
| VB4 = | ( −60, | −5, | −4, | −3, | −2, | −1) |

Then, feature set sequences TA1–TA4, TB1–TB4 are constructed from the feature vectors VA1–VA4, VB1–VB4 by selecting one to five elements in sequence in decreasing order of magnitude, first the largest element of the feature vector, then the two largest elements, and so on, and by combining the region numbers corresponding to the thus selected elements. The results are shown below.

TA1={1}, {1,2}, {1,2,3}, {1,2,3,4}, {1,2,3,4,5}

TA2={2}, {2,3}, {1,2,3}, {1,2,3,5}, {1,2,3,5,6}

TA3={3}, {1,3}, {1,2,3}, {1,2,3,6}, {1,2,3,4,6}

TA4={4}, {4,5}, {4,5,6}, {1,4,5,6}, {1,2,4,5,6}

TB1={4}, {3,4}, {3,4,5}, {3,4,5,6}, {1,3,4,5,6}

TB2={3}, {3,4}, {3,4,6}, {3,4,5,6}, {1,3,4,5,6}

TB3={3}, {3,4}, {3,4,5}, {3,4,5,6}, {2,3,4,5,6}

TB4={6}, {5,6}, {4,5,6}, {3,4,5,6}, {2,3,4,5,6}

The dictionary is created by storing these feature sets in memory by associating them with category names. FIG. 5 shows a part of the dictionary based on the above example. It is shown, for example, that the feature set {3} is common to category names "A" and "B". As described, the dictionary is created by constructing feature sets from model patterns, creating records by associating the feature sets with category names, and arranging the records in ascending order of feature sets. The dictionary structure allows one feature set to be associated with more than one category name. Accordingly, the creation of the dictionary can be accomplished in a time proportional to the number of input model patterns, achieving a drastic reduction in dictionary creation time as compared with the prior known method. Furthermore, model patterns can be easily added since the procedure only requires making modification or addition only to part of the dictionary. The dictionary structure described above also contributes to reducing the time required for pattern recognition.

Figure 6:
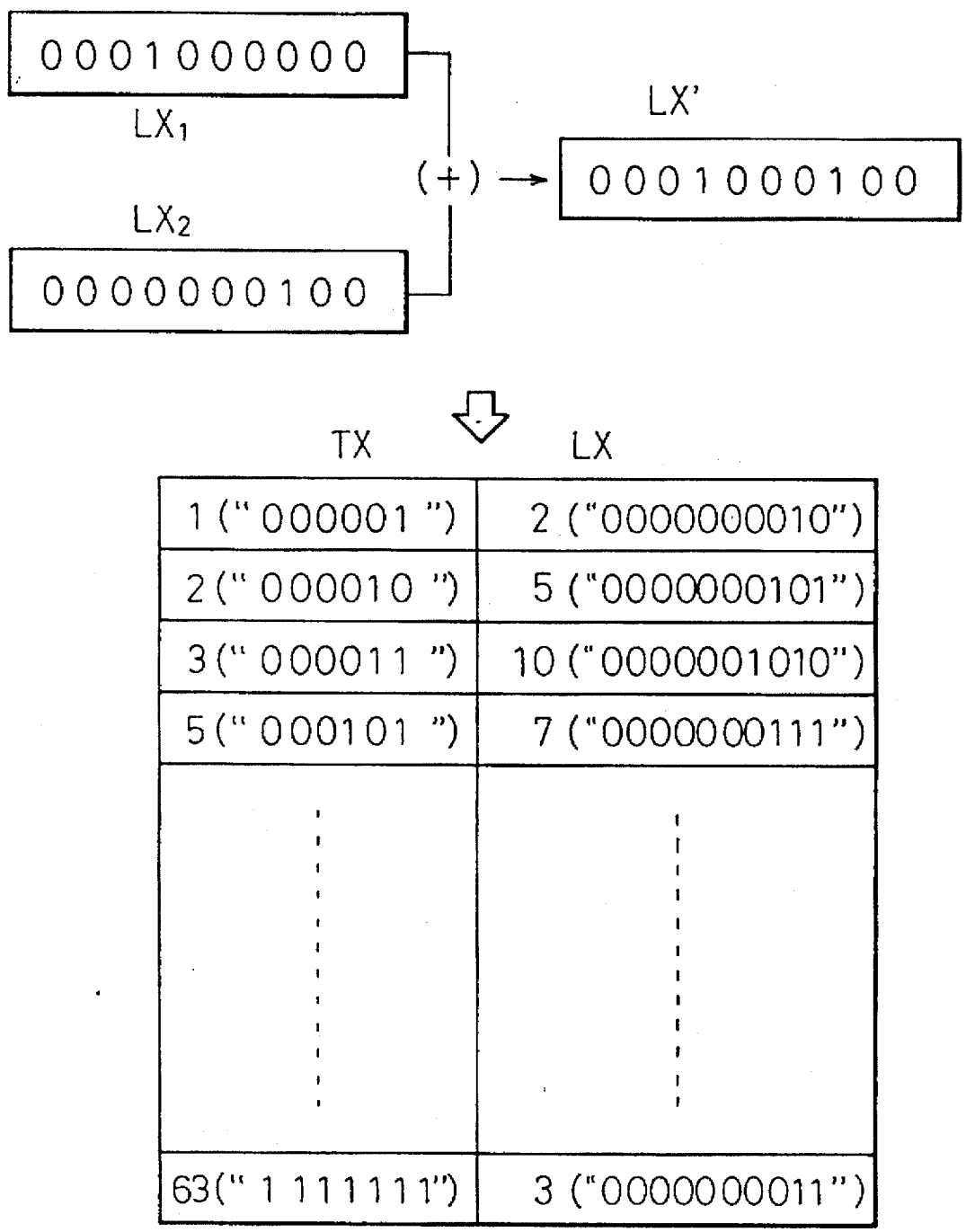
FIG. 6 is a diagram for explaining the data structure of the pattern recognition dictionary.

FIG. 6 is a diagram for explaining the data structure of the pattern recognition dictionary, showing an example in which category names are represented by bit positions. When one feature set is associated with different category names $LX_1$ and $LX_2$, as described above, the category names $LX_1$ and $LX_2$ may be ORed into a category name LX' for storing in the dictionary. With such processing, one record of the dictionary is formed from a combination of a feature set and a category name represented by a bit string of the same number of bits as the number of category names to be identified. For the feature set TX also, the element position in a feature vector, or the subregion number, can be represented by bit positions in a bit string of the same number of bits as the number of subregions. For example, in the case of the earlier described six-subregion construction, the elements "1" to "6" are represented by bit positions in a bit string of six bits; for example, the feature set {2, 3} is represented by "000110".

The dictionary structure of FIG. 6, in which feature sets TX are associated with category names LX, is related to a case where there are six subregions and ten categories. In the example shown, the feature set TX=1 ("000001") is associated with the category name LX=2 ("0000000010"), in which case one feature set is associated with one category name; on the other hand, the feature set TX=2 ("000010") is associated with the category name LX=5 ("0000000101") which corresponds to two category names represented by different bit positions of "1".

Figure 7:
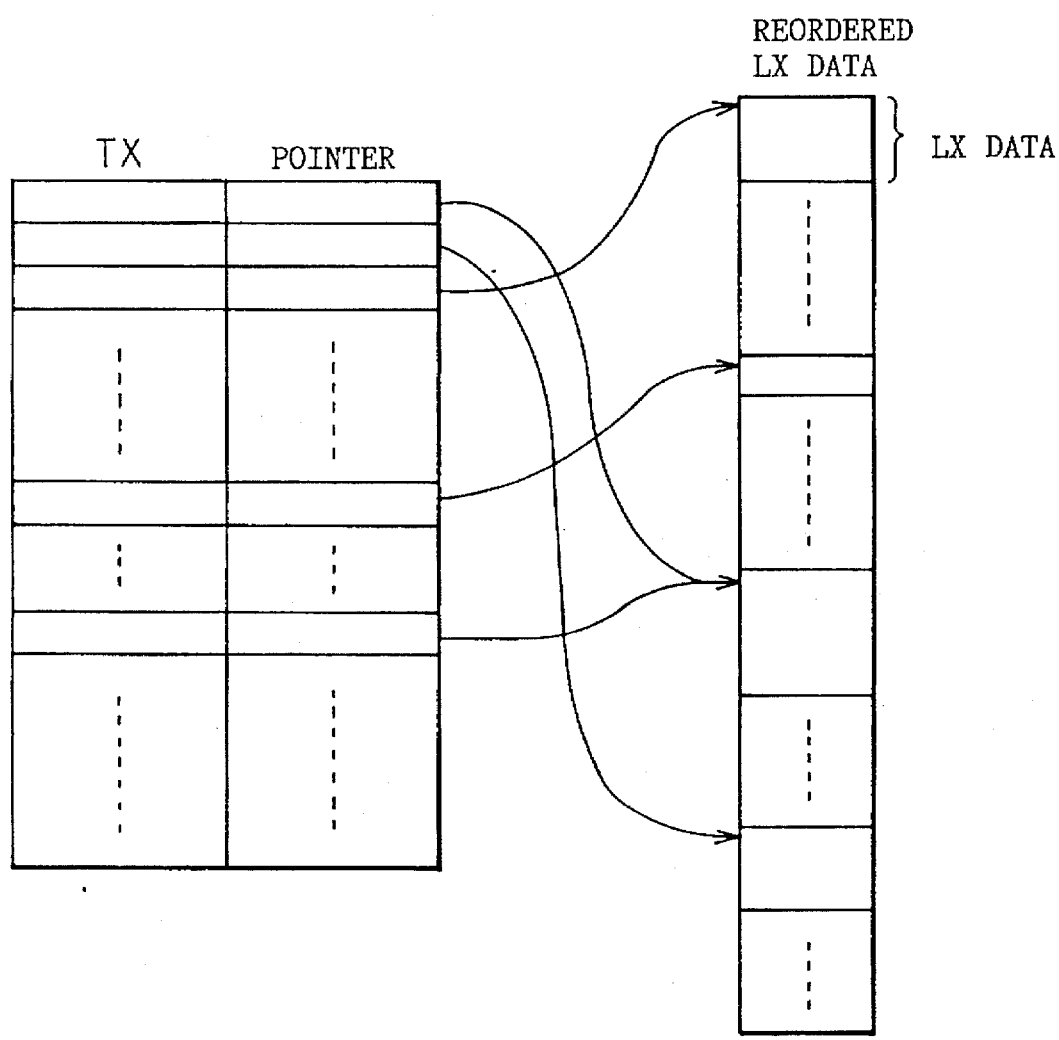
FIG. 7 is a diagram for explaining compression of dictionary data.

If the number of categories is large, requiring a large number of bits to represent the category name LX, data compression/restoration techniques as used in various kinds of data processing may be employed. For example, as shown in FIG. 7, LX data are reordered and duplicate data are deleted to reduce the data amount, thus producing new LX data. Then, a table is constructed that consists of combinations of TX values and pointer information to the LX data. The table may be compressed if it does not have any ill effect on the recognition process.

It is also possible to represent the feature set TX by an address. In that case, TX=1, 2, 3, 5, . . . , 63 in FIG. 6, for example, are represented by addresses 1, 2, 3, 5, . . . , 63, LX=2 being stored at address 1, LX=5 at address 2, and so on. Since there is no associated category name LX for address 4, LX=0 is stored at address 4.

Figure 8:
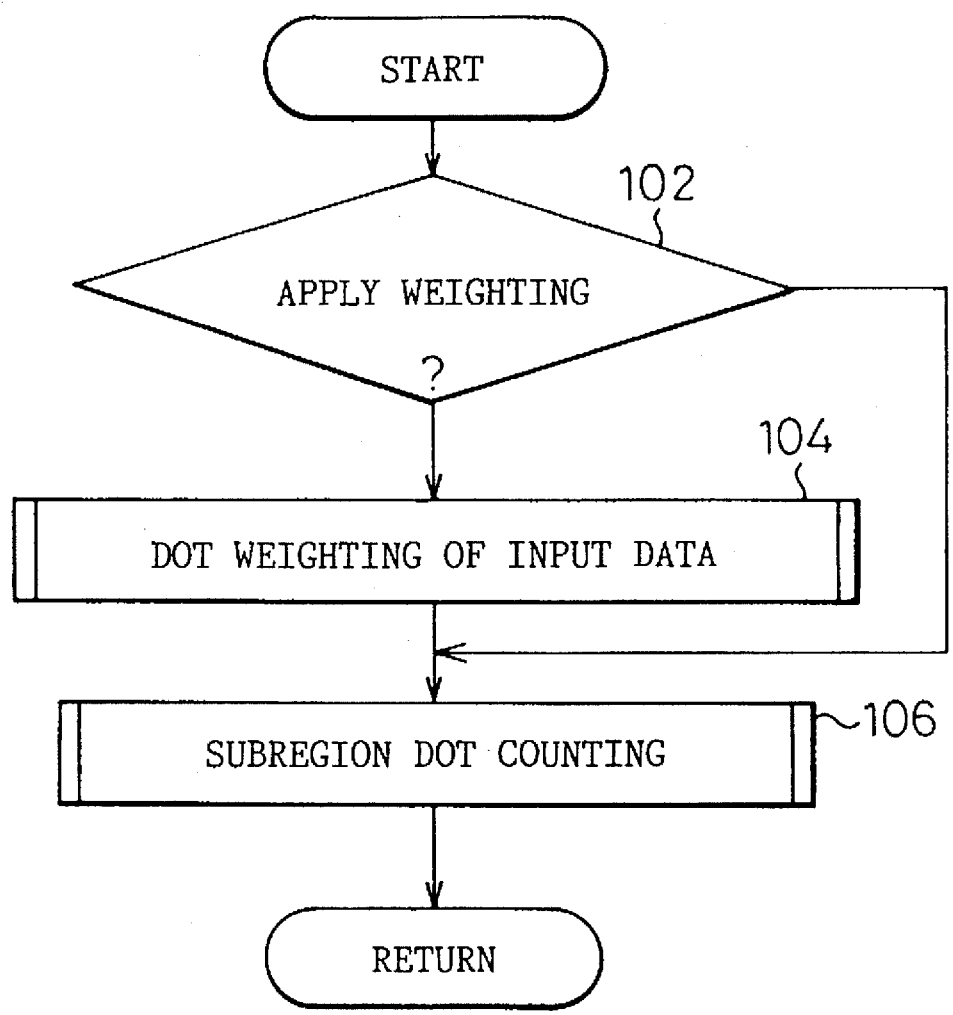
FIG. 8 is a flowchart illustrating a procedure for feature vector creation.
Figure 9:
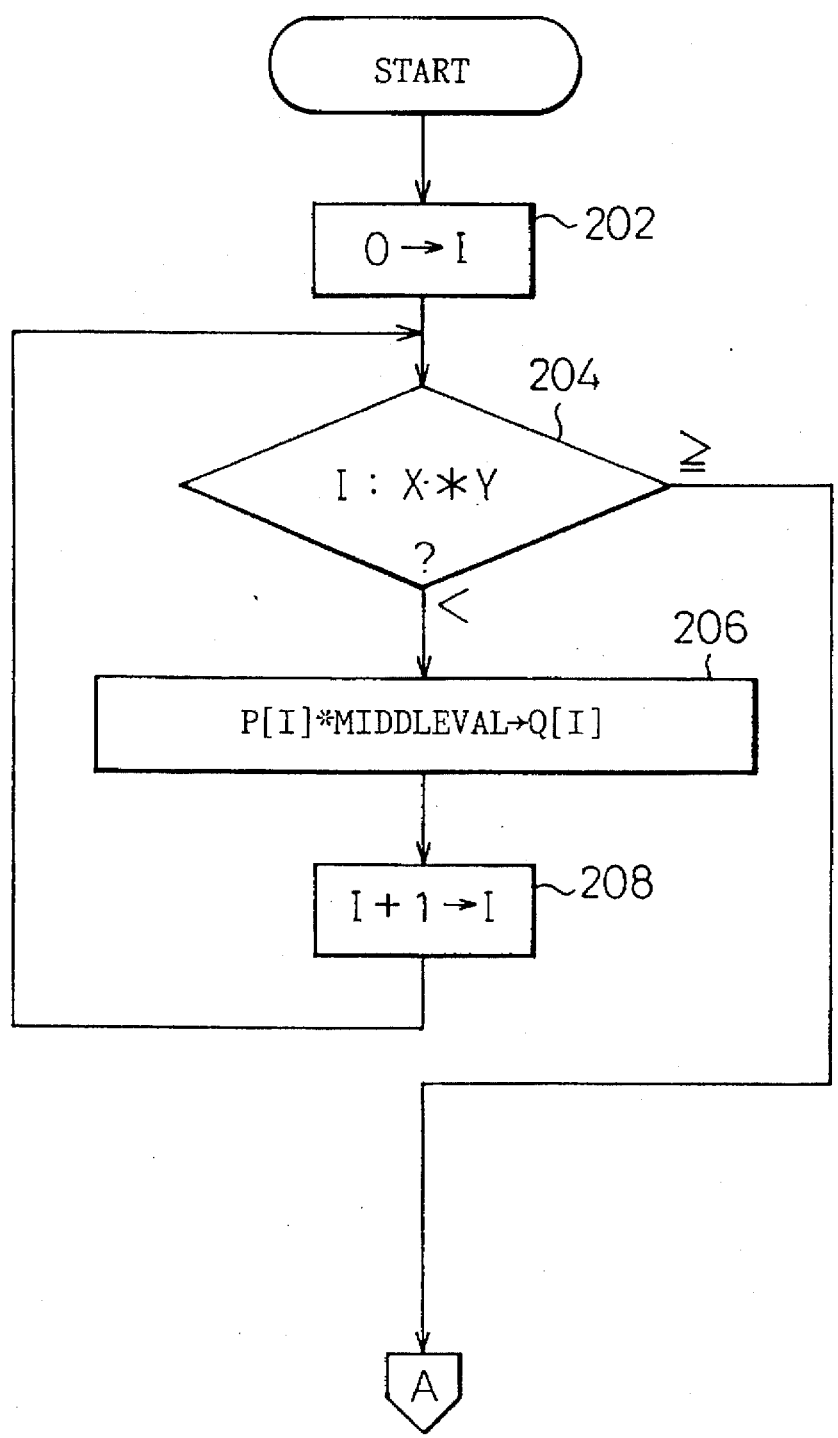
FIGS. 9 to 13 show a flowchart illustrating a procedure for assigning weights to input pattern dots.

Next, a procedure for constructing a feature vector will be described with a specific example. FIG. 8 is a flowchart illustrating the basic procedure for constructing a feature vector. The feature vector creation routine shown here is called from a dictionary creation process or from an input pattern recognition process; these processes will be described later. The feature vector creation process may be modified in various ways according to the purpose, etc., of a particular pattern recognition system, and the following shows a typical example.

First, a decision is made as to whether pattern data is to be weighted or not (step 102). If the data is to be weighted, dot weighting is applied to the pattern data (step 104), after which the weighted dots are counted (step 106). On the other hand, if it is decided that no weighting is to be applied, the process jumps to the step of counting the dots in the pattern data (step 106). The above is the basic procedure for feature vector construction. Next, the weighting process and the counting process will be described in detail below.

FIGS. 9 to 13 show a flowchart illustrating the weighting process, showing an example of processing performed in step 104 in FIG. 8. First, 0 is substituted for a variable I (which specifies the dot position within the recognition region) (step 202). Next, denoting the horizontal dot count of the input pattern recognition region as X and the vertical dot count as Y, it is judged whether I is smaller than X×Y, that is, whether I points to a position on the inside of the last dot in the recognition region (step 204). If I≧X×Y, the process proceeds to step 210; if I<X×Y, the process proceeds to step 206.

In step 206, the input pattern P[I] is multiplied by a predetermined middle value MIDDLEVAL to produce a weighted pattern Q[I]. The input pattern P[I] is represented by "0" for a white dot and "1" for a black dot, for example. Therefore, if the middle value is set at "16", each black dot represented by "1" is weighted to a value "16". Next, I is incremented (step 208), and the process loops back to step 204. It is desirable from the viewpoint of calculation that the middle value be so selected as to avoid a situation where the white area ("0") is eventually rendered a negative value as a result of weighting. In the present embodiment, the middle value is set to "16" to avoid such a situation. This value is, however, not restrictive.

Figure 10:
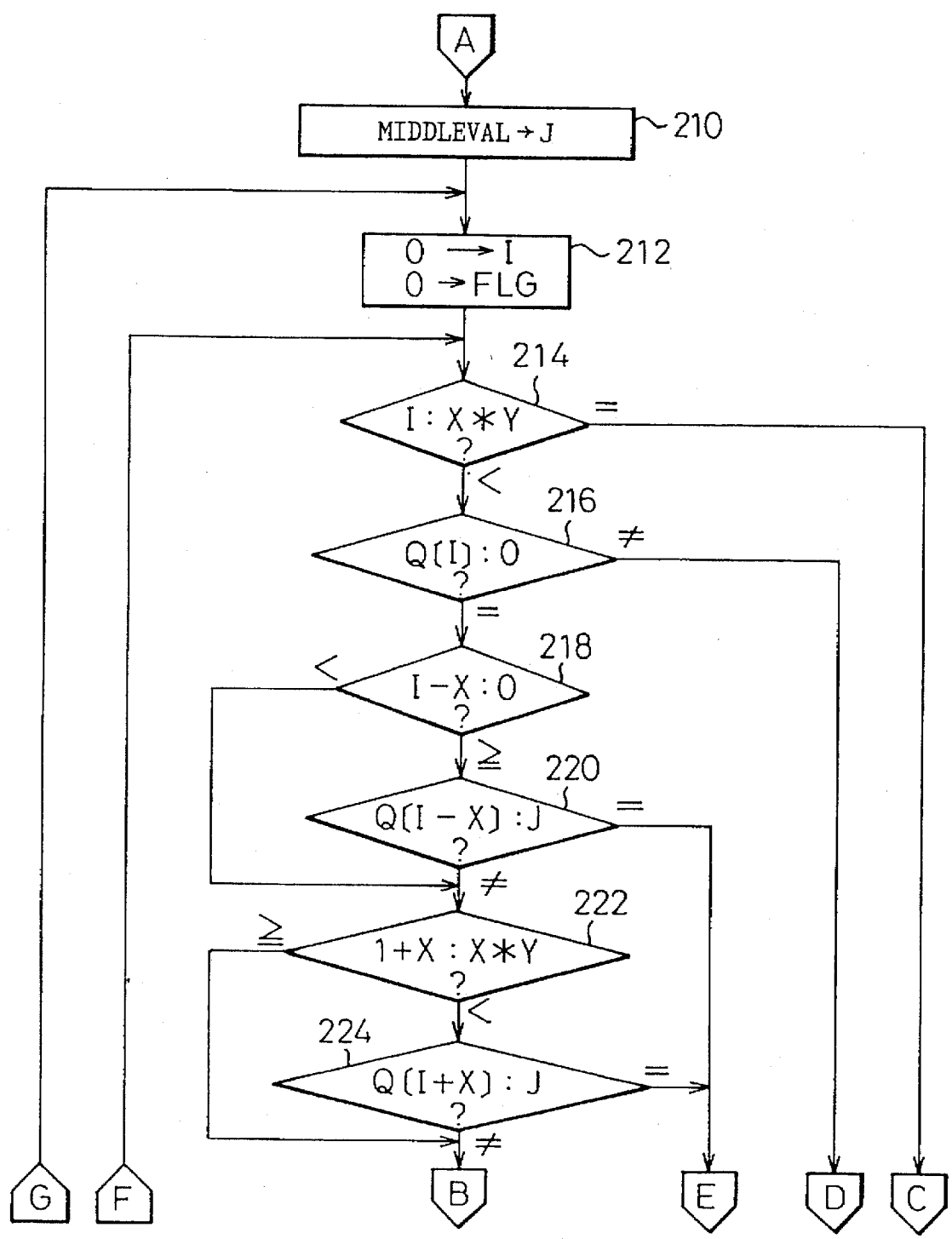
Figure 11:
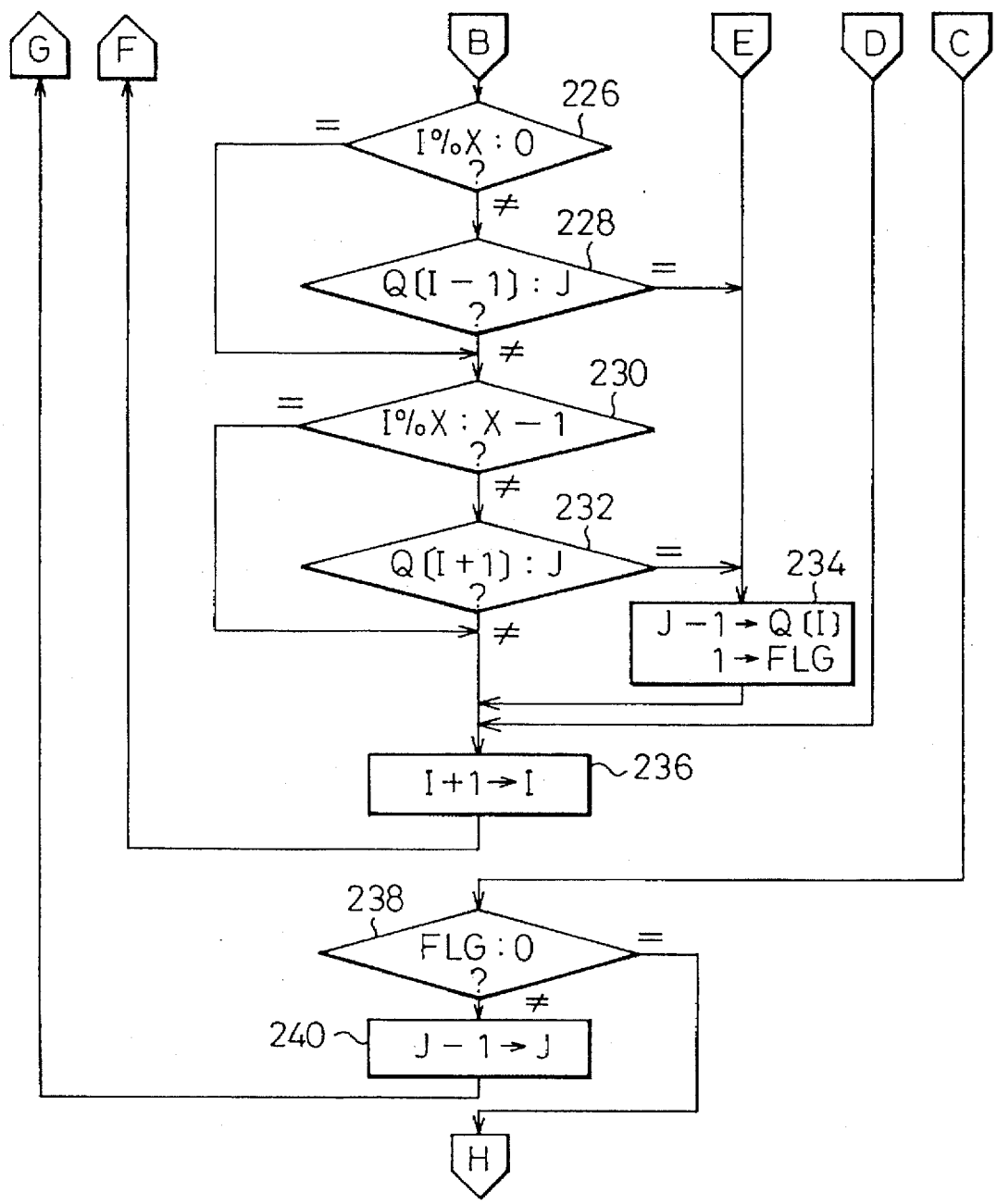
Figure 12:
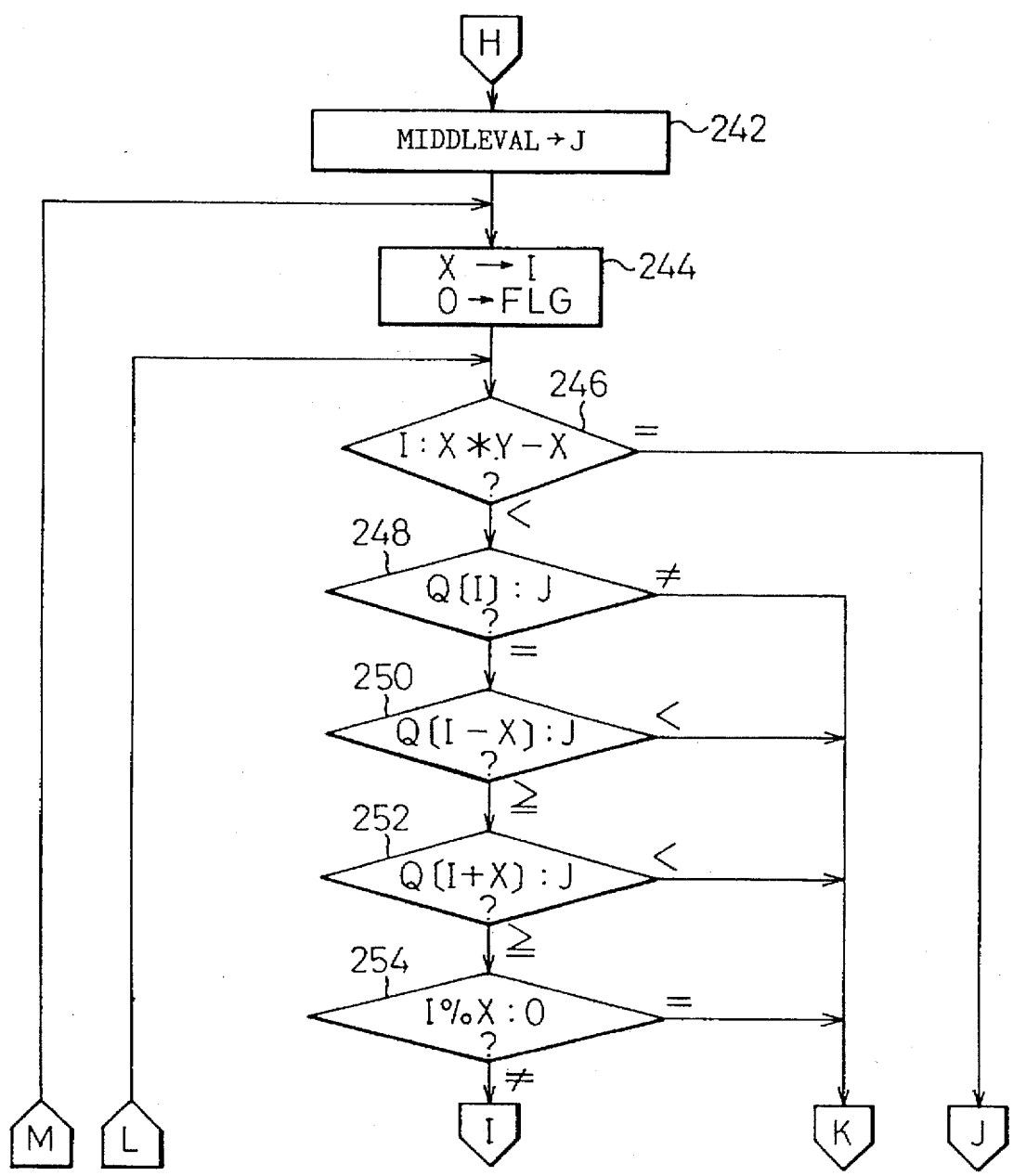
Figure 13:
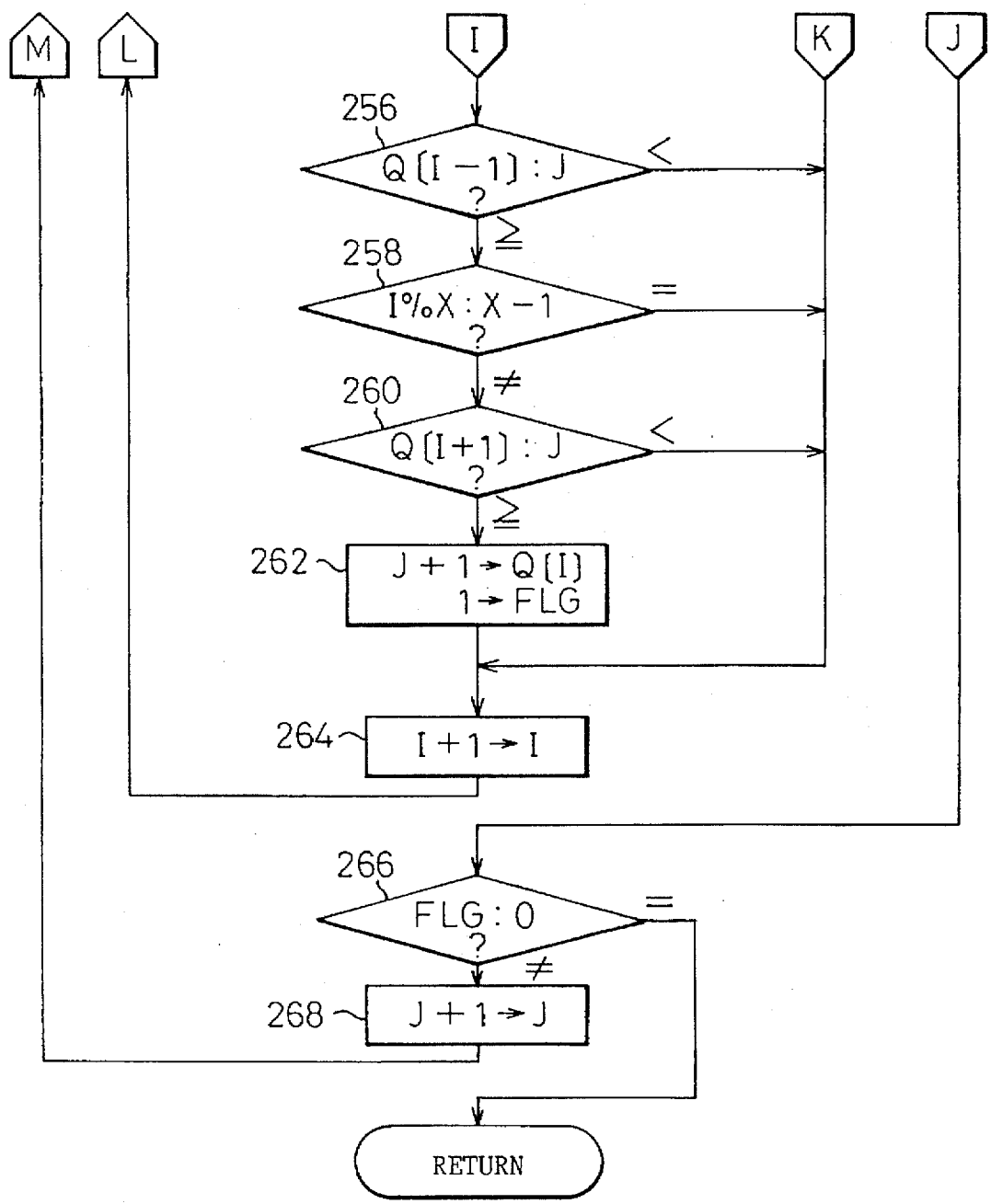

When the processing in step 206 is completed for all possible I's, finishing the processing on all the dots, and I=X×Y is satisfied in step 204, then the process proceeds to step 210 (FIG. 10). Suppose, for example, that the input pattern P[I] shown in FIG. 14A (X=9, Y=11, giving I=0 to 98) is input. In that case, the pattern Q[I] shown in FIG. 14B will have been constructed by the time the process proceeds to step 210. In FIG. 14A, "1" represents a black dot, and "0" denotes a white dot.

In step 210, the middle value MIDDLEVAL is substituted for variable J. Next, 0 is substituted for the variable I, and a prescribed flag FLG is set to 0 (step 212). In the next step (step 214), I is compared with X×Y. If I=X×Y, the process proceeds to step 238; if I<X×Y, the process proceeds to step 216. In step 216, Q[I] is compared with 0; if Q[I]≠0, the process proceeds to step 236, and if Q[I]=0, the process proceeds to step 218.

In step 218, I−X is compared with 0; if I−X<0, the process proceeds to step 222, and if I−X≧0, the process proceeds to step 220. In step 220, Q[I−X] is compared with J; if Q[I−X]=J, the process proceeds to step 234, and if Q[I−X]≠J, the process proceeds to step 222. That is, when the value Q[I] of the current dot is 0, and when the value Q[I−X] of the dot one line above it is equal to J, the process proceeds to step 234 to change Q[I].

In step 222, I+X is compared with X×Y; if I+X≧X×Y, the process proceeds to step 226, and if I+X<X×Y, the process proceeds to step 224. In step 224, Q[I+X] is compared with J; if Q[I+X]=J, the process proceeds to step 234, and if Q[I+X]≠J, the process proceeds to step 226. That is, when the value Q[I] of the current dot is 0, and when the value Q[I+X] of the dot one line below it is equal to J, the process proceeds to step 234 to change Q[I].

In step 226 (FIG. 11), the remainder of I/X, that is, I%X, is compared with 0; if the remainder is 0, that is, if I%X=0, the process proceeds to step 230, and if the remainder is not 0, that is, if I%X≠0, the process proceeds to step 228. Here, "%" is the modulo operator in the C language. In step 228, Q[I−1] is compared with J; if Q[I−1]=J, the process proceeds to step 234, and if Q[I−1]≠J, the process proceeds to step 230. That is, when the value Q[I] of the current dot is 0, and when the value Q[I−1] of the neighboring dot to the left of it is equal to J, the process proceeds to step 234 to change Q[I].

In step 230, the remainder of I/X, that is, I%X, is compared with X−1; if I%X=X−1, the process proceeds to step 236, and if I%X≠X−1, the process proceeds to step 232. In step 232, Q[I+1] is compared with J; if Q[I+1]=J, that is, if the neighbor to the right of Q[I] is equal to J, the process proceeds to step 234, and if Q[I+1]≠J, the process proceeds to step 236. That is, when the value Q[I] of the current dot is 0, and when the value Q[I+1] of the neighboring dot to the right of it is equal to J, the process proceeds to step 234 to change Q[I].

In step 234, J−1 is substituted for Q[I], and the flag FLG is set to "1". This means that the weight for a white dot adjacent to a black/white boundary of the input pattern is changed to the value of J−1 (initially, 16−1=15).

In step 236, the value of the variable I is incremented before looping back to step 214 to carry out the above processing on the next dot.

When the above processing is completed on all the dots, and I=X×Y is satisfied in step 214, the process proceeds to step 238. By the time the process reaches step 238 for the first time, the previously mentioned pattern of FIG. 14B will have been transformed into the pattern shown in FIG. 14C in which "15" is set for white dot areas adjacent to the boundaries.

In step 238, it is judged whether the flag FLG is "0" or not. If the flag is "1", J is decremented (step 240) to loop back to step 212. If the flag FLG is "0" in step 238, this means that the processing has proceeded up to a point where the pattern of FIG. 14C, for example, has been transformed into the pattern shown in FIG. 14D. In that case, the process proceeds to step 242.

In step 242 (FIG. 12), the middle value MIDDLEVAL is substituted for the variable J. In the next step 244, the horizontal dot count X is substituted for the variable I, and the flag FLG is set to "0". Then, in step 246, I is compared with X×Y−X; if I=X×Y−X, the process proceeds to step 266, and if I<X×Y−X, the process proceeds to step 248. In step 248, Q[I] is compared with J; if Q[I]=J, the process proceeds to step 250, and if Q[I]≠J, the process proceeds to step 264.

In step 250, Q[I−X] is compared with J; if Q[I−X]<J, the process proceeds to step 264, and if Q[I−X]≧J, that is, if the value of the dot one line above Q[I] is equal to the variable J, the process proceeds to step 252.

In step 252, Q[I+X] is compared with J; if Q[I+X]<J, the process proceeds to step 264, and if Q[I+X]≧J, that is, if the value of the dot one line below Q[I] is equal to the variable J, the process proceeds to step 254.

In step 254, the remainder of I/X, that is, I%X, is compared with 0; if I%X=0, the process proceeds to step 264, and if I%X≠0, the process proceeds to step 256. In step 256 (FIG. 13), Q[I−1] is compared with J; if Q[I−1]<J, the process proceeds to step 264, and if Q[I−1]≧J, that is, if the neighbor to the left of Q[I] is equal to J, the process proceeds to step 258.

In step 258, the remainder of I/X, that is, I%X, is compared with X−1; if I%X=X−1, the process proceeds to step 264, and if I%X≠X−1, the process proceeds to step 260. In step 260, Q[I+1] is compared with J; if Q[I+1]<J, the process proceeds to step 264, and if Q[I+1]≧J, that is, if the neighbor to the right of Q[I] is equal to J, the process proceeds to step 262.

In step 262, since Q[I] and the values one line above, one line below, and to the right and left of it, are all equal to J, J+1 is substituted for Q[I]. That is, if the value of the variable J is 16 (initial value), 17 is substituted for Q[I]. Then, the flag FLG is set to 1, and the process proceeds to 264.

In step 264, the variable I is incremented, and the process loops back to step 246 to carry out the processing on the next dot.

In step 246, if equation I=X×Y−X is satisfied for the first time, this means that the weighting process has proceeded to a point where the previously mentioned pattern of FIG. 14D, for example, has been transformed into the pattern shown in FIG. 14E.

In step 266, it is judged whether the flag FLG is "0" or not. If it is not "0", J is incremented (step 268), and the process loops back to step 244. If the flag FLG is "0" in step 266, this means that the processing has proceeded to a point where the pattern of FIG. 14E has been transformed into the final pattern shown in FIG. 14F, and the weighting process is terminated. The pattern Q[I] (FIG. 14F) weighted according to the distance from the black/white boundary can thus be obtained from the input pattern P[I] (FIG. 14A).

Figure 16:
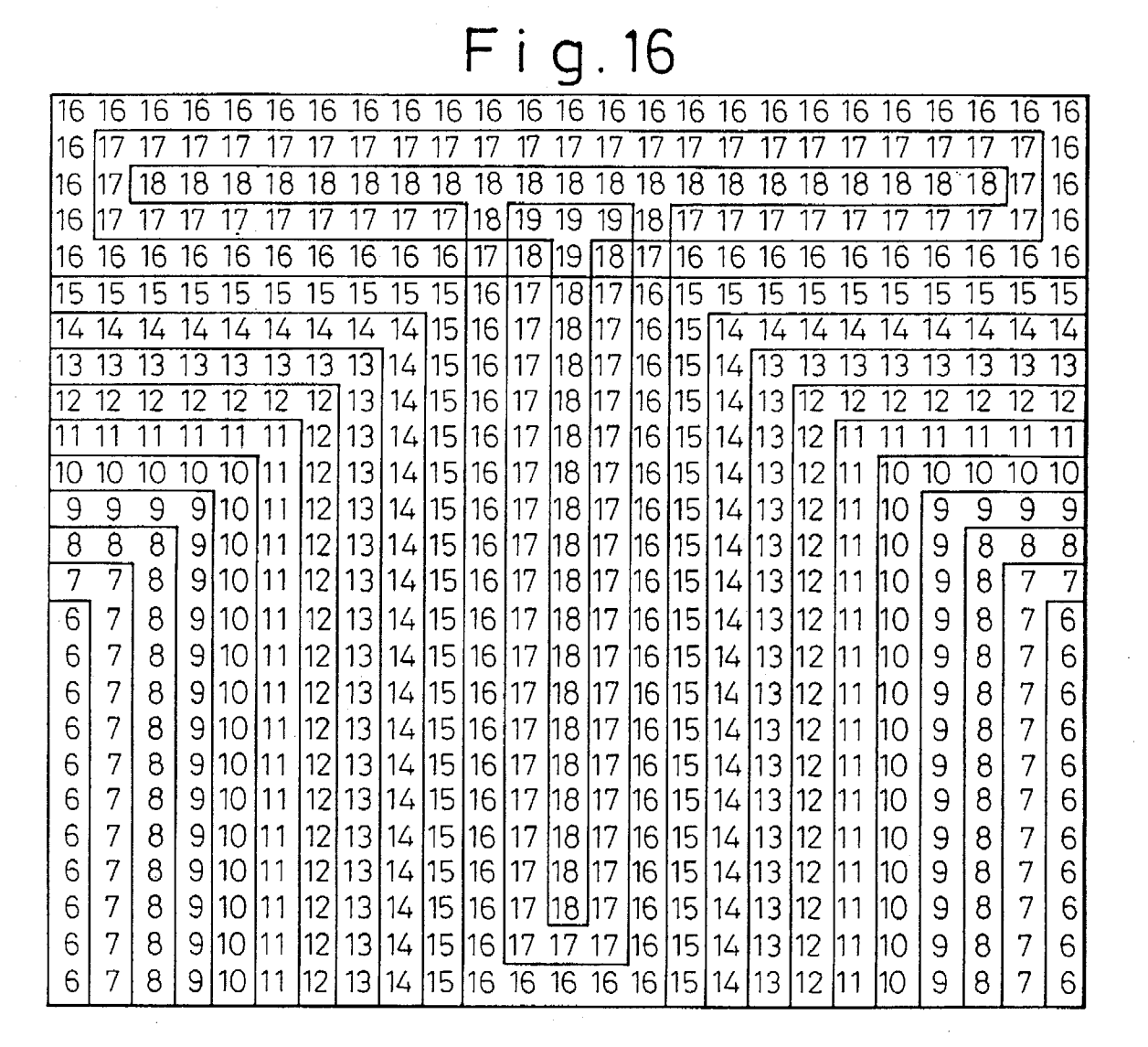

FIG. 15 shows an example of an input pattern constructed from a larger number of dots than the example shown in FIG. 14A. Shown here is an input pattern P[I] corresponding to an alphabetical letter T. When the above-described weighting process is carried out on this input pattern P[I] (the middle value MIDDLEVAL is set to 16), the result will be as shown in FIG. 16. That is, weights, 17, 18, and 19, are assigned according to the distance from the periphery of the area consisting of 1s, while weights, 15, 14, . . . , 7, and 6, are assigned according to the distance from the periphery of the area consisting of 0s.

Next, the process of counting the dots within each subregion (step 106 in FIG. 8) will be described in detail below. This process is carried out to obtain a feature vector from an input pattern or a weighted pattern, and involves adding up the number of black dots or the values of weighted dots within each of the subregions formed by dividing the recognition region.

If the result of dividing the horizontal dot count X by the number of horizontal divisions VX does not yield an integer, or if the result of dividing the vertical dot count Y by the number of vertical divisions VY does not yield an integer, the values of the dots sitting on the boundary are distributed between the subregions concerned according to their area sizes. In calculating the dot values, rather than dividing the values of the dots on the boundary according to the ratio between their area sizes, the values of the dots not on the boundary are multiplied by VX×VY, thus avoiding calculations involving decimal fractions. This also results in multiplying the values of the feature vector V by VX×VY, but these multiplied values can be used as are, since it is only necessary to know the relative magnitude among them. For example, when the pattern of FIG. 14F (X=9, Y=11) is divided with VX=2 and VY=3, addition operations are performed on the data shown in FIG. 17, as a result of which the feature vector shown in FIG. 18 is obtained.

Figure 19:
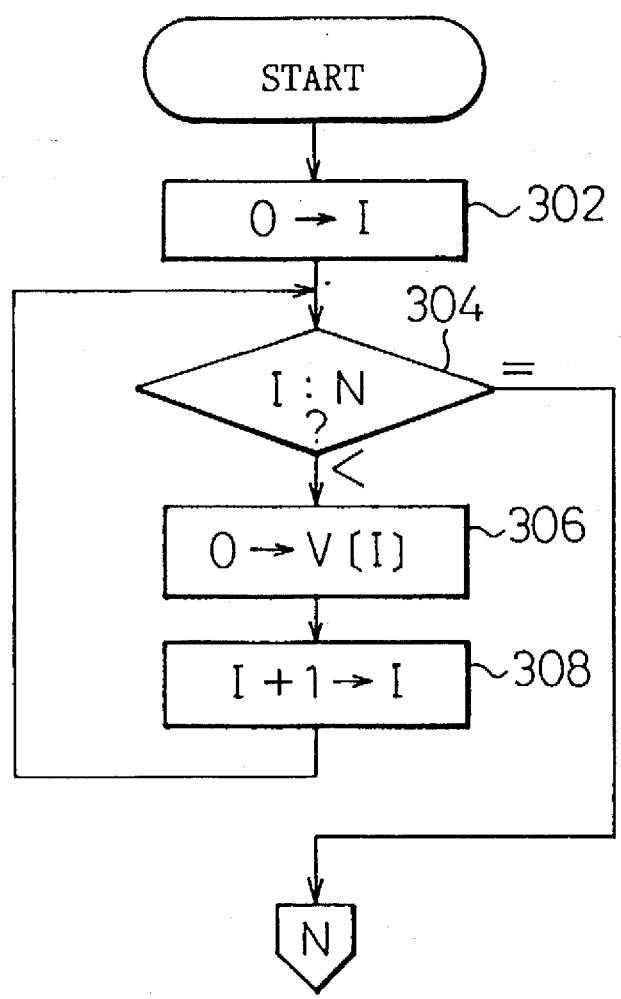
FIGS. 19 and 20 show a flowchart illustrating a procedure for counting the dots within each subregion.
Figure 20:
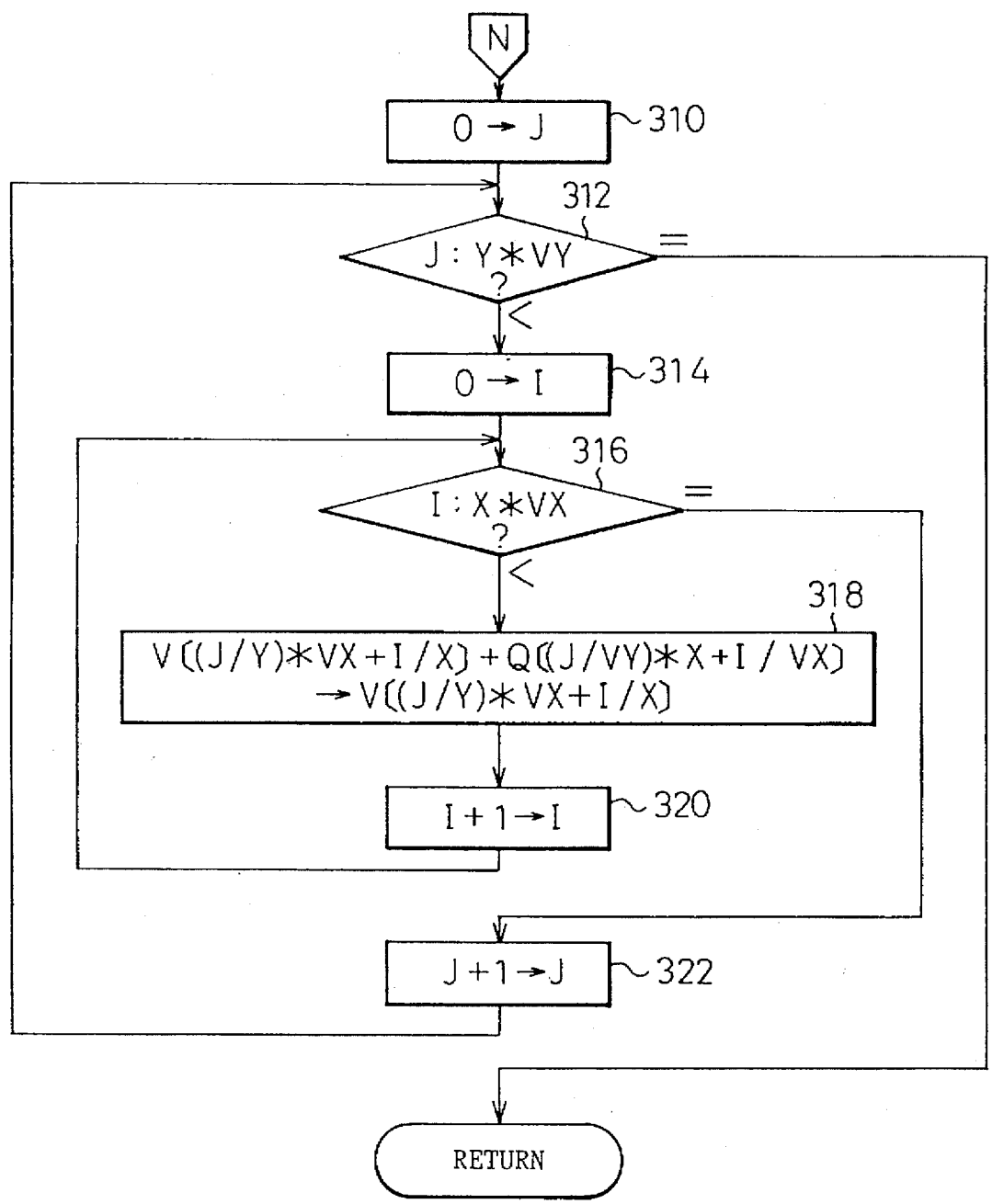

FIGS. 19 and 20 show a flowchart showing in specific form how the counting process is carried out. First the variable I is set to 0 (step 302), and then I is compared with N (N=feature vector dimension) (step 304). If I=N, the process proceeds to step 310; if I<N, the process proceeds to step 306. In step 306, 0 is substituted for an element V[I] of the feature vector V, and in the next step 308, I is incremented before looping back to step 304. That is, with the processing in steps 304, 306, and 308, each element V[I] of the feature vector V is initialized to 0.

In step 310, the variable J is set to 0. In the next step 312, it is judged whether J=Y×VY or not. Here, VY denotes the number of vertical divisions, and VX the number of horizontal divisions; therefore, the dimension N of the feature vector is N=VX×VY. If J=Y×VY, the counting process is terminated. If J<Y×VY, the variable I is set to 0 (step 314), and then, it is judged whether I=X×VX or not (step 316). If I=X×VX, the process proceeds to step 322; if I<X×VX, the process proceeds to step 318.

In step 318, the following operation is carried out. V[(J/Y)*VX+I/X]←V[(J/Y)*VX+I/X]+Q[(J/VY)*X+I/VX] This operation performs additions by taking into account the case where the result of dividing the horizontal dot count X by the number of horizontal divisions VX does not yield an integer or where the result of dividing the vertical dot count Y by the number of vertical divisions VY does not yield an integer, as previously described.

In step 320, I is incremented to loop back to step 316. On the other hand, in step 322, J is incremented to loop back to step 312.

With the above processing, the number of dots or the values of weighted dots in each of the subregions resulting from the division of the X×Y recognition region with the division numbers VX and VY are added together. For example, when the pattern of FIG. 14F (X=9, Y=11) is divided with VX=2 and VY=3, it will be easily understood that addition operations are performed on the data shown in FIG. 17, as a result of which the feature vector shown in FIG. 18 is obtained.

Figure 21:
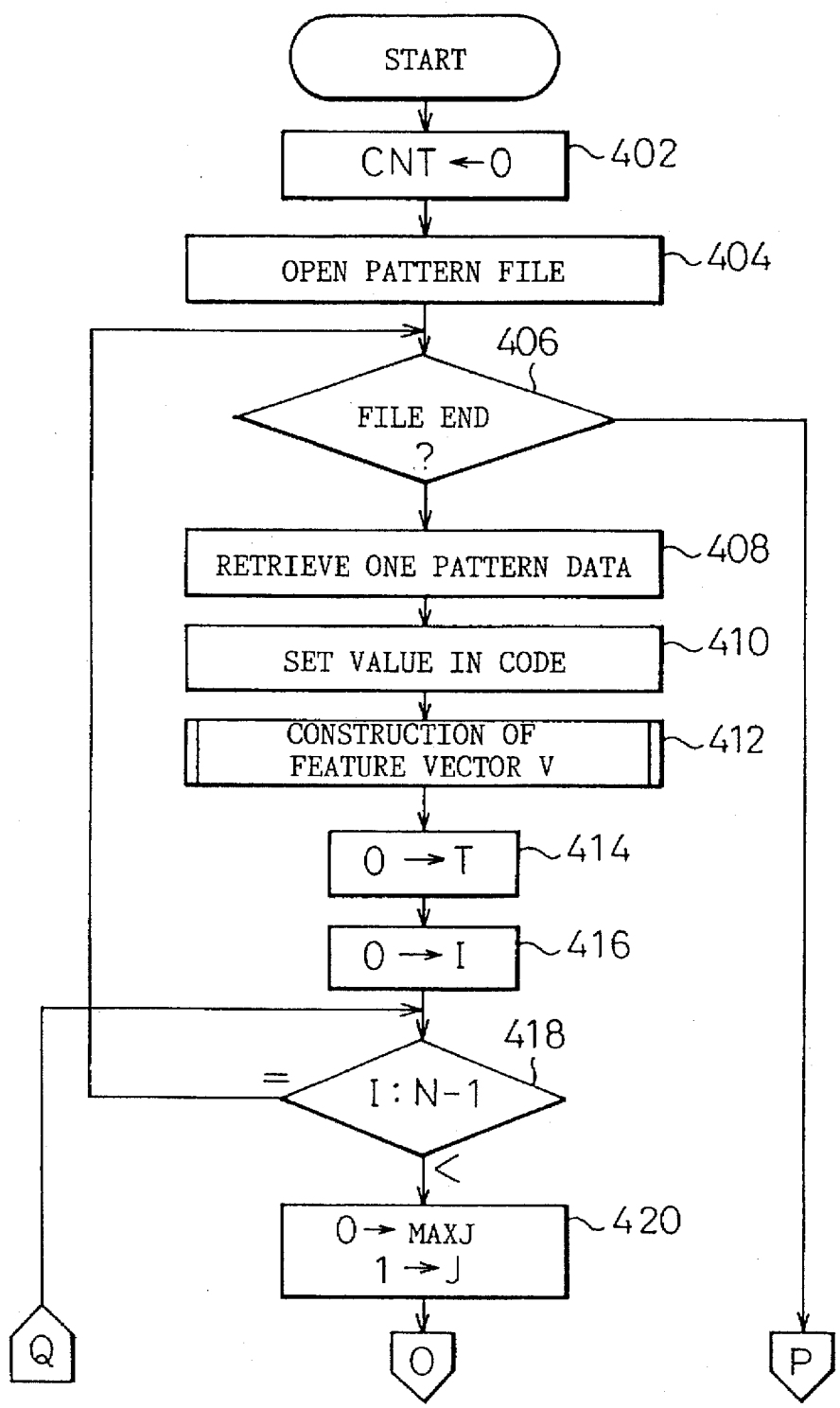
FIGS. 21 to 23 show a flowchart illustrating a procedure for creating a dictionary.
Figure 22:
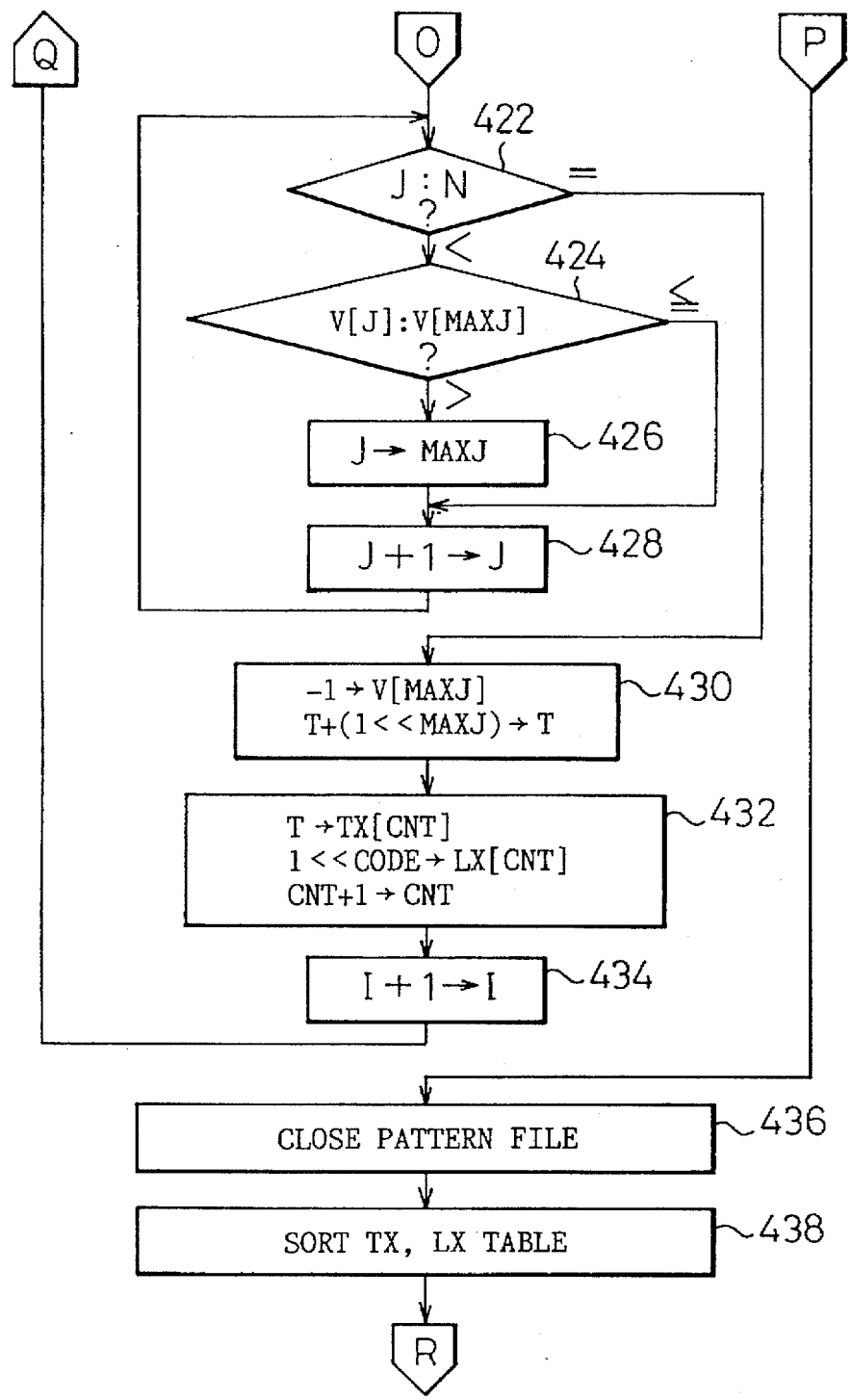
Figure 23:
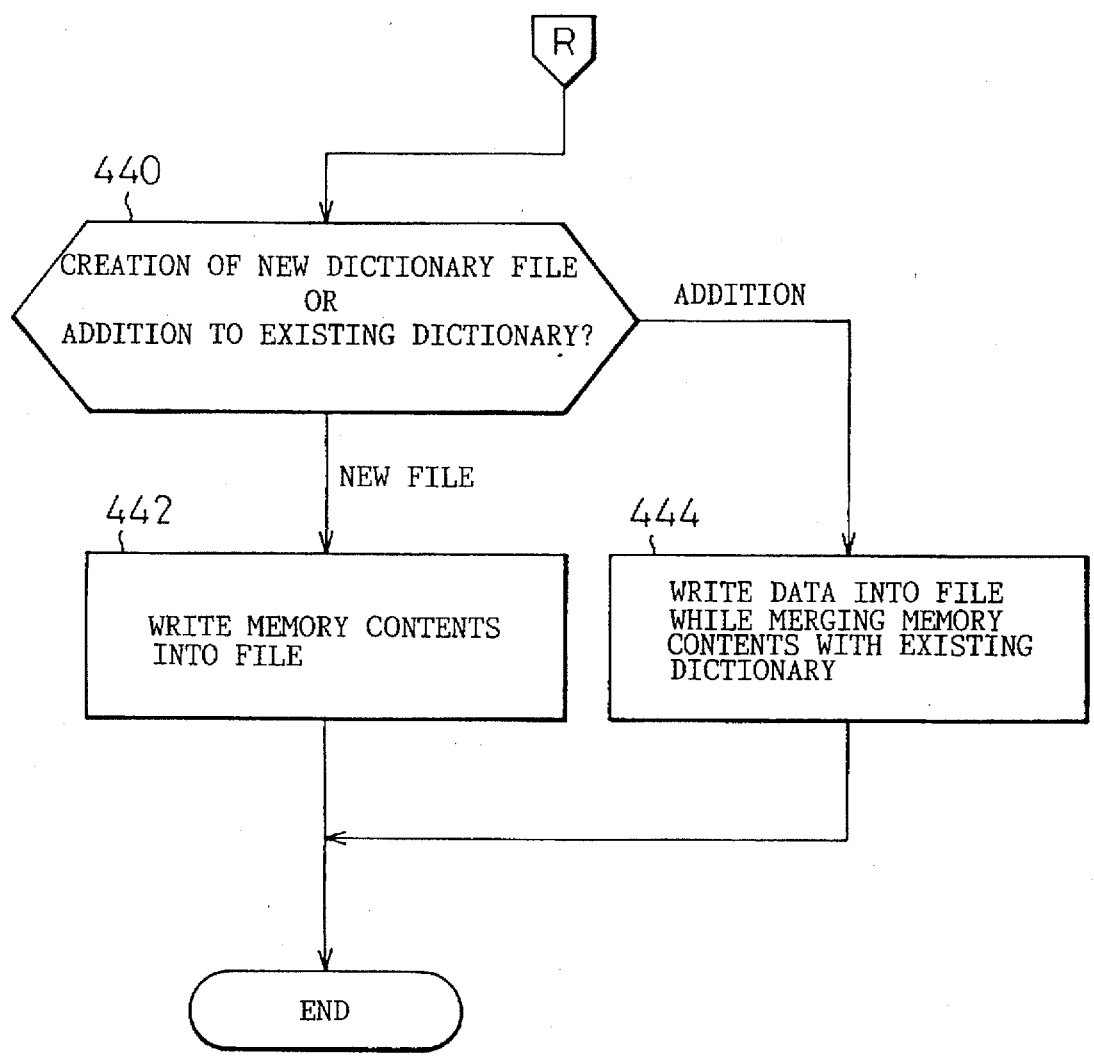

We will now describe a procedure for creating a dictionary using the above feature vector creation process. FIGS. 21 to 23 show a flowchart illustrating the dictionary creation procedure. Here, the dimension of the feature vector V is N, and the illustrated routine is for creating a dictionary in which a plurality of records, each consisting of feature set TX and category name LX, are stored as shown in FIG. 6.

First, a counter CNT for specifying record address is cleared to "0" (step 402). Next, a pattern file (stored, for example, on the hard disk 15) is opened (step 404). Then, it is checked whether processing has been completed on all pattern data contained in that file (step 406).

If not completed yet, pattern data representing one model pattern is retrieved (step 408). Then, one value, selected from among values 0 to L−1 and corresponding one for one to the applicable category name, is set in a prescribed variable CODE (step 410). Here, L indicates the number of category names. Construction of the feature vector V consisting of N elements is performed in accordance with the earlier described procedure (step 412). When the feature vector of the model pattern has been constructed, the initial value 0 is substituted for the feature set T (step 414), and the variable I is set to 0 (step 416).

Next, I is compared with N−1 (step 418). If I=N−1 (as a result of incrementing I in step 434 as described later), the process loops back to step 406; if I<N−1, the process proceeds to step 420.

In step 420, variable MAXJ is set to 0, and J is set to 1, after which the process proceeds to step 422. In step 422, J is compared with N; if J=N, the process proceeds to step 430, and if J<N, the process proceeds to 424. In step 424, an element V[J] of the feature vector V is compared with the previous maximum value V[MAXJ]; if V[J]>V[MAXJ], the process proceeds to step 426, and if V[J]≦V[MAXJ], the process proceeds to step 428. In step 426, since the current element V[J] is larger than the previous maximum value V[MAXJ], the current value of J is substituted for the variable MAXJ, and the process proceeds to step 428. In step 428, J is incremented to loop back to step 422.

In step 430, −1 is substituted for V[MAXJ] so that the largest element retrieved in the current processing cycle will not be detected when searching for the largest element in the next processing cycle. This is to prevent any vector element from taking a negative value in the feature vector creation process according to the present embodiment, as previously described. Further, the MAXJ-th bit in the feature set T is set to 1; here, the least significant bit (LSB) is at bit position 0. Using the left shift operator "<<", a bit handling operator in the C language, this operation is expressed as $T \leftarrow T + (1 << MAXJ)$ In the next step 432, the thus obtained feature set T is stored as the contents of the feature set table TX[CNT]. Further, the CODE-th bit is set to 1 (the LSB is at bit position 0), the other bits are set to 0, and the resulting bit string is stored as the contents of the category information table LX[CNT]. These operations are expressed as $TX[CNT] \leftarrow T$ $LX[CNT] \leftarrow 1 << CODE$ Then, the counter CNT is incremented, and the process proceeds to step 434. In step 434, the variable I is incremented to loop back to step 418.

To summarize, for one pattern data, the elements of the feature vector V are sequentially retrieved in decreasing order of magnitude, and the process of creating a record consisting of a feature set and category information is repeated until a total of (N−1) records are created. When processing on one pattern data is completed, the process returns to step 406 to check the file for any pattern remaining to be processed.

When the above processing is completed on all pattern data stored in the pattern file, the pattern file is closed (step 436). Next, the table consisting of feature sets TX and category information LX is sorted (step 438). It is desirable from the viewpoint of processing speed that the so-called frequency sorting method be employed, because with the frequency sorting method dictionary creation can be accomplished in a time proportional to the number of patterns. Of course, other sorting methods may be used. Next, it is judged whether the current dictionary creation process is for the creation of a new dictionary file or for adding data to the existing dictionary (step 440). In the case of a new dictionary file, the contents of the memory are written into the file (step 442). At the same time, merging is performed on identical feature sets, as shown in FIG. 6. In the case of data addition, the data are written into the file while merging the memory contents with the dictionary (step 444). The above processing completes the creation of the pattern recognition dictionary.

Figure 24:
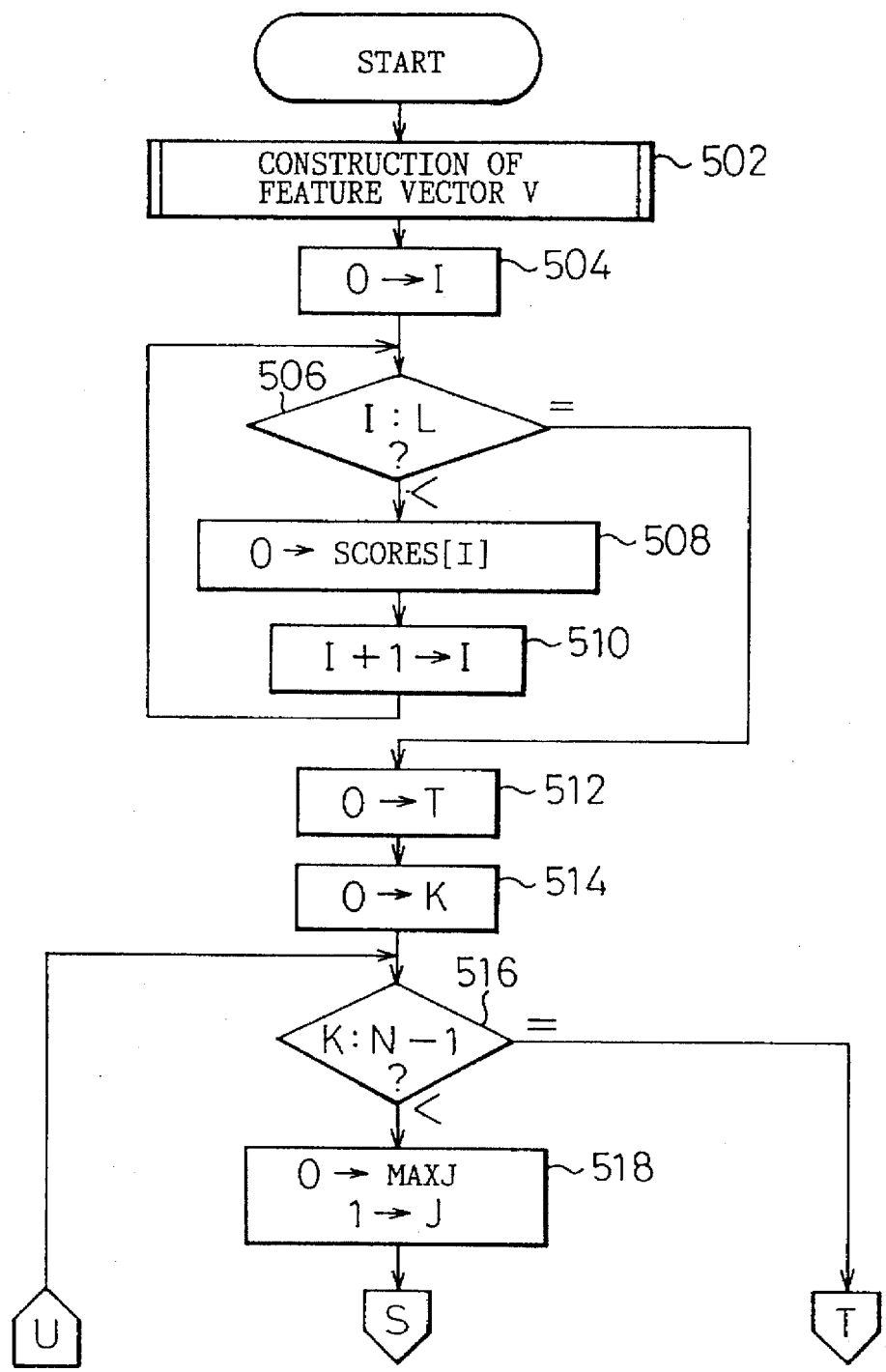
FIGS. 24 and 25 show a flowchart illustrating a procedure for input pattern recognition.
Figure 25:
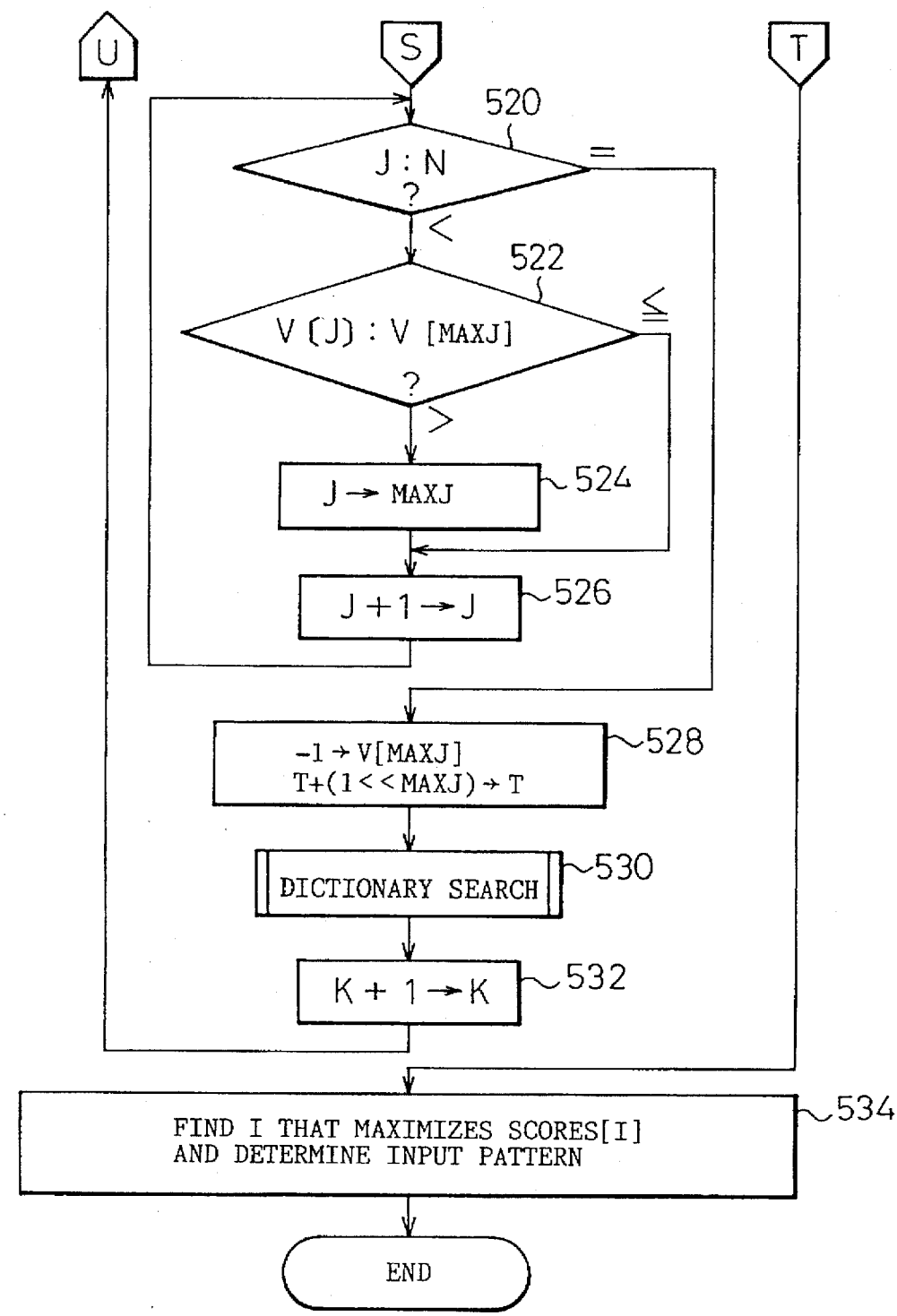

Next, a procedure for recognizing an input pattern will be described with reference to the flowchart shown in FIGS. 24 and 25. First, a feature vector, similar to the one created in the above dictionary creation process, is constructed for the input pattern (step 502). Then, the variable I is set to 0 (step 504), and it is judged whether I=L (L is the number of category names) (step 506). If I=L, the process proceeds to step 512. If I≠L, the similarity SCORES[I] between the feature set and the applicable category name (identified by the variable I) in the dictionary is initialized to 0 (step 508), and I is incremented (step 510), after which the process loops back to step 506. That is, with the processing in steps 504 to 510, the similarity SCORES[I] (I=0 to L−1) is initialized.

In step 512, the feature set T is initialized to 0, and in the next step 514, variable K is set to 0 before proceeding to step 516. In step 516, it is judged whether K=N−1 or not; if K=N−1, the process proceeds to step 534. On the other hand, if K<N−1, the process proceeds to step 518.

Steps 518 to 528 are identical to steps 420 to 430 in the earlier described dictionary creation process; with these steps, the feature set T is obtained. Then, the dictionary search process hereinafter described is carried out (step 530), after which K is incremented (step 532) and the process loops back to step 516.

In step 534, I that maximizes the similarity SCORES[I] is obtained, and the category name corresponding to such I is determined as the category name of the input pattern, after which the input pattern recognition process is terminated.

Figure 26:
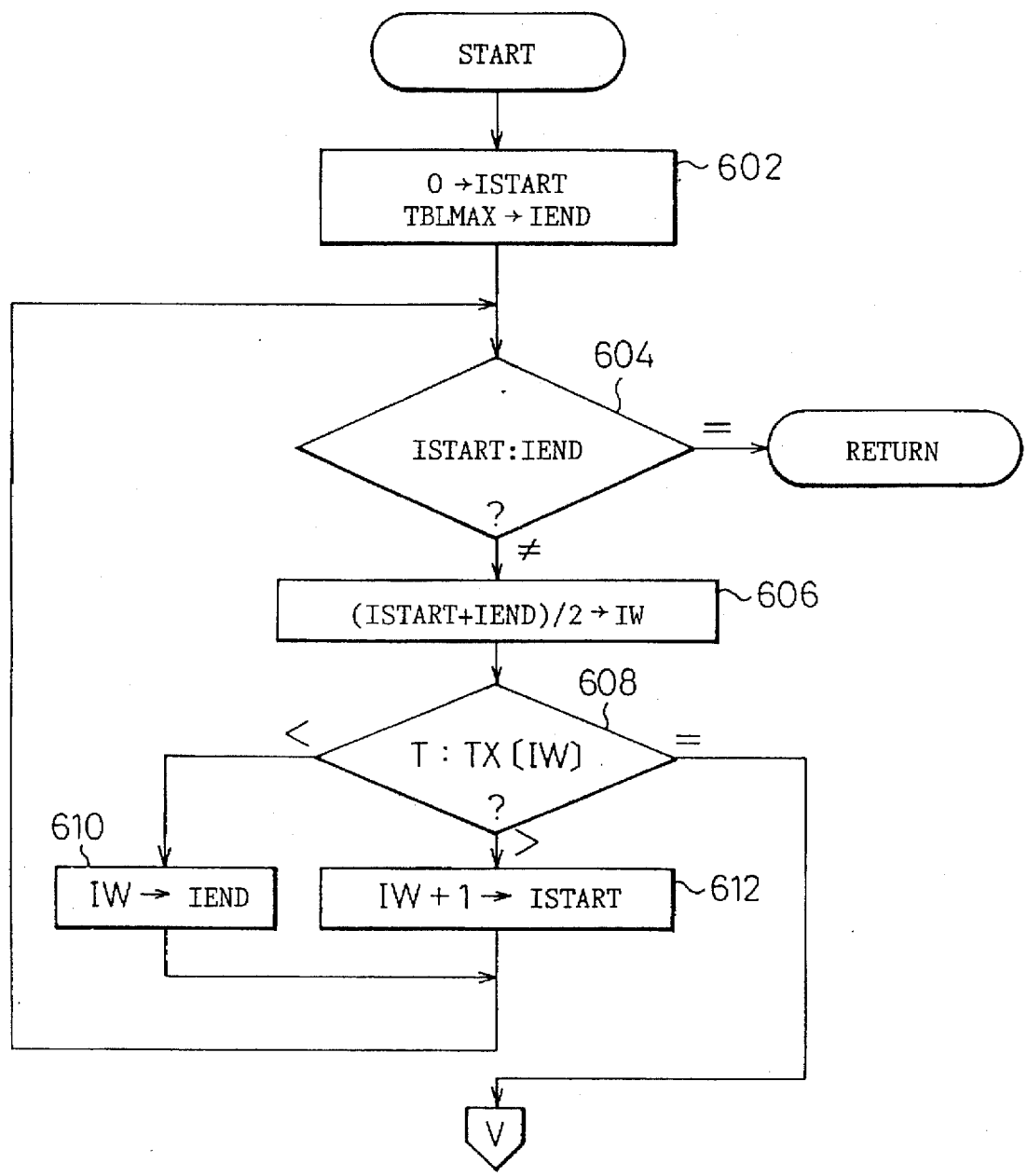
FIGS. 26 and 27 show a flowchart illustrating a procedure for dictionary search.
Figure 27:
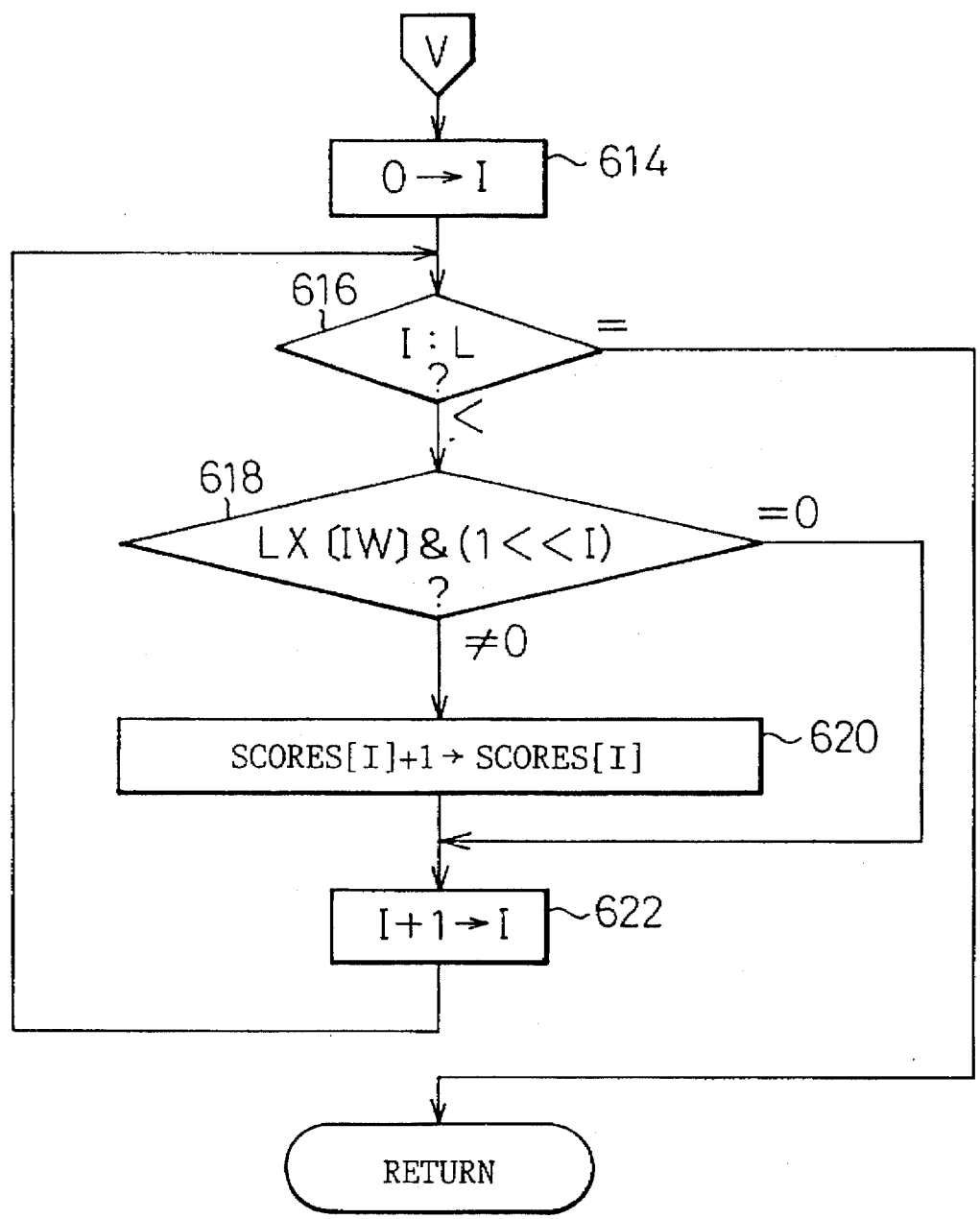

FIGS. 26 and 27 show a flowchart illustrating the steps in the dictionary search process performed in step 530 in the above input pattern recognition process. First, in step 602, initialization is performed by setting variable ISTART to 0 and substituting a prescribed value TBLMAX for variable IEND. The prescribed value TBLMAX indicates the number of records stored in the dictionary. In the next step 604, ISTART is compared with IEND. If ISTART=IEND, the dictionary search process is terminated; if ISTART≠IEND, the process proceeds to step 606.

The search process in this embodiment is performed in accordance with a binary search method, and in step 606, (ISTART+IEND)/2 is substituted for variable IW. That is, the sum of the start address and end address is divided by 2, and the result is taken as the intermediate address IW. In the next step 608, the feature set T is compared with TX[IW]. If T=TX[IW], the process proceeds to step 614; if T<TX[IW], the process proceeds to step 610; and if T>TX[IW], the process proceeds to step 612.

In step 610, IW is substituted for IEND, and the process loops back to step 604. In step 612, IW+1 is substituted for ISTART, to loop back to step 604. In step 614, 0 is substituted for I, and the process proceeds to the next step 616.

In step 616, I is compared with L; if I=L, the dictionary search process is terminated, and if I<L, the process proceeds to step 618. In step 618, the I-th bit of the category name LX[IW] is tested to see if it is "1". Here, the least significant bit is at bit position 0. In other words, a test is made to determine whether the AND of LX[IW] and 1<<I, i.e., LX[IW]&1<<I, is 0 or not. If the AND is 0, the process proceeds to step 622; otherwise, the process proceeds to step 620.

In step 620, the similarity SCORES[I] is incremented by +1, before proceeding to step 622. In step 622, I is incremented, and then the process loops back to 616. The dictionary searching procedure has been described above.

We will now describe the feature set and similarity in further detail below. Suppose that we use a pattern recognition dictionary in which a feature set sequence $T_1^{(c)}, \ldots, T_{N-1}^{(c)}$ (where $1 \leq c \leq L$, L=total number of category names) is stored for each model pattern associated with one category name. Then, the similarity $S^{(c)}$ between an input pattern having the feature sets $T_1^*, \ldots, T_{N-1}^*$ and a model pattern corresponding to the c-th category name, is given by $$S^{(c)}=[1/(n-1)]\Sigma_{I=1}^{N-1}\phi(T_I^*, T_I^{(c)}) \quad (5)$$

where $\phi(T_1, T_2)=0$ (when $T_1 \neq T_2$)
$\phi(T_1, T_2)=1$ (when $T_1 = T_2$)
$\Sigma_{I=1}^{N-1}$ indicates summation from I=1 to I=N−1

The above is extended to a case where each category name has feature set sequences for a plurality of model patterns corresponding to different type styles, etc. That is, when a given category name c corresponds to m model patterns and the matrix of feature sets $$\begin{array}{cccc} T_{11}^{(c)}, & T_{12}^{(c)}, & \ldots & , T_{1N-1}^{(c)} \\ \cdot & \cdot & \ldots & \cdot \\ \cdot & \cdot & \ldots, T_{ij}^{(c)}, \ldots, & \cdot \\ \cdot & \cdot & & \cdot \\ T_{m1}^{(c)}, & T_{m2}^{(c)}, & \ldots & , T_{mN-1}^{(c)} \end{array}$$

are formed, the similarity is defined as given below, and is referred to as the "power space similarity".

$$S^{(c)}=[1/(N-1)]\Sigma_{I=1}^{N-1}C_I \times max\{\phi(T_I^*, T_{iI}^{(c)})\}_{i=1}^m \quad (6)$$

where $C_I$ is a constant (usually 1)

i is 1 to m

I is 1 to N−1

$max\{ \}_{i=1}^m$ is the maximum value that the value in { } takes when i is varied between 1 and m.

In the present invention, the power space similarity between each feature set obtained from an input pattern and the feature sets stored in the character recognition dictionary is calculated as defined by equation (6), and the category name of the model pattern that provides the greatest similarity is determined as the category name of the input pattern.

For example, consider a case in which input patterns PX1 and PX2 with unknown category names are to be recognized using the pattern recognition dictionary shown in FIG. 5. Suppose that the input patterns PX1 and PX2 respectively have the feature vectors

VX1=(6, 888, 9999, −55, 77, −444)

VX2=(25, 16, 34, 61, 52, 43)

Then, the feature set sequence created from the feature vector VX1 of the input pattern PX1 is

{3}, {2,3,}, {2,3,5}, {1,2,3,5}, {1,2,3,4,5}

On the other hand, the feature set sequence created from the feature vector VX2 of the input pattern PX2 is

{4}, {4,5}, {4,5,6}, {3,4,5,6}, {1,3,4,5,6}

When the feature sets of the input pattern PX1 are matched against the feature sets in the dictionary of FIG. 5, the following becomes apparent about the feature sets of the input pattern PX1.

{3} is linked to category names A and B.

{2, 3} is linked to category name A.

{2, 3, 5} is not linked to any category name.

{1, 2, 3, 5} is linked to category name A.

{1, 2, 3, 4, 5} is linked to category name A.

If ⅕ point is given to one link, the similarity between the input pattern PX1 and the category name A is ⅘, and the similarity between the input pattern PX1 and the category name B is ⅕.

In like manner, the similarity between the input pattern PX2 and the category name A is ⅗, and the similarity between the input pattern PX2 and the category name B is ⅘. As a result, the input pattern PX1 is identified as the category name A, and the input pattern PX2 as the category name B. It is also possible to present choices of category names in the order of similarity.

Alternatively, similarity may be obtained by combining a plurality of similarity calculation methods; for example, similarity $SA^{(c)}$ is obtained by an A method and similarity $SB^{(c)}$ by a B method, and the combined similarity $S^{(c)}$ is calculated as $$S^{(c)}=(SA^{(c)}+SB^{(c)})/2$$

Furthermore, when performing character recognition using classification such as broad classification, medium classification, or narrow classification, the above recognition method can be applied to the classification at any desired level. This is possible because in the present invention similarities are calculated for all categories, and thus the method of the invention can be applied in various ways.

As described above, in the present invention, the "power space similarity" between each feature set of the input pattern and the feature sets stored in the dictionary is obtained, and the category name that has the greatest similarity is determined as the category name of the input pattern. It has been confirmed that this method of the invention achieves a high recognition rate. Also, in the calculation of similarity, since the records in the dictionary are arranged in ascending order of feature sets and a search can be made using, for example, a binary search method, an address representation method, or the like, a similarity calculation need not be performed for all the feature sets stored in the dictionary but can be accomplished by referencing only part of the dictionary contents. This has the effect of reducing the time required for recognition. Furthermore, since a similarity calculation is performed for all the category names, the method of the invention can be applied, for example, to broad classification, etc., used in pattern recognition, and thus offers great advantages in terms of applicability.

Using a dot printer, 52 single-byte capital and small alphabetical characters and 10 numeric characters were actually printed, and the printed characters were read using a scanner having a resolution of 300 dpi (dots per inch) and were used as model patterns for dictionary creation and also as input patterns for measurement of the recognition rate. The number of characters used for the dictionary was 62 type styles×80 sets=4960 characters, and the number of characters input for measurement of the recognition rate was 62 type styles×40 sets=2480 characters. The results showed that the time required to create the dictionary, using a personal computer, was about 151 seconds and the recognition rate was 98.75%. Recognition errors occurred due to great similarities in patterns between capital and small letters, but by inputting information on character size, a recognition rate of 99.75% was achieved.

Further, 2965 kanji characters in the JIS Class I Character Set were printed using a laser printer, and the printed characters were read by the 300-dpi scanner and were used as model patterns for dictionary creation and also as input patters for measurement of the recognition rate. In this case, a recognition rate of 99.97% was achieved. The time required to recognize one character was about 0.019 second. Furthermore, handwritten characters, 0 to 9 and X, were presented for dictionary creation and for measurement of the recognition rate. In this case, for a total of 10,994 characters, a recognition rate of 98.86% was obtained. This recognition rate is sufficient for practical use.

In the creation of the pattern recognition dictionary, according to the invention, N features are extracted from each model pattern to construct a feature vector, and N−1 feature sets are constructed from the feature vector; these feature sets are stored in memory by associating them with category names, one feature set being allowed to be associated with more than one category name. This reduces the time required to create the dictionary even when there are large numbers of model patterns and category names, making it possible to create the dictionary economically. A further advantage is that model patterns can be easily added to the dictionary since addition only requires modifying part of the dictionary.

POTENTIAL FOR EXPLOITATION IN INDUSTRY

The present invention can be applied to all kinds of pattern recognition by suitably choosing the method of feature vector creation. More specifically, the invention may be applied, among others, to optical character recognition (OCR) readers, and also to medical diagnosis systems and speech recognition systems (recognizing voice waveforms as patterns). The effect of reducing the dictionary creation time and the recognition time can be obtained, as hitherto described, whatever the feature vector creation method. Furthermore, the high recognition rate has been demonstrated by the fact that the patterns used for the creation of the dictionary always provide correct answers, and also by the various instances of character recognition (performed on handwritten characters, printed characters, numbers, alphabetical letters, kanji, etc.) where an excellent recognition rate was achieved.

What is claimed is:

1. A method of pattern recognition, comprising the steps of:

(a) creating N subregions by dividing a region in which a pattern being an object of recognition is pictured into N blocks and numbering the N blocks so that each block has a corresponding subregion number;

(b) constructing a feature vector having N features as elements by calculating a feature for each of the N subregions in accordance with a prescribed criterion;

(c) constructing a total of (N−1) feature sets by retrieving the largest or smallest of the N elements of the feature vector to construct a first feature set consisting of one subregion number corresponding to the retrieved element, then retrieving the two largest or two smallest elements to construct a second feature set consisting of a combination of two subregion numbers corresponding to the two retrieved elements, and continuing such a retrieval and construction pattern until constructing the (N−1)th feature set consisting of a combination of (N−1) subregion numbers; and (d) by reference to a dictionary in which feature sets obtained by performing the steps (a) to (c) on various kinds of model patterns are prerecorded along with category names of the model patterns, obtaining similarities between the feature sets of the input pattern and the feature sets stored in the dictionary in corresponding relationship to the category names, and determining a category name that provides the greatest similarity, as the category name of the input pattern;

wherein dividing the region in step (a) means dividing the region into N subregions of equal area size, and the feature calculated in step (b) is based on the sum of the values of dots in each individual subregion.

2. A method of pattern recognition, comprising the steps of:

(a) creating N subregions by dividing a region in which a pattern being an object of recognition is pictured into N blocks and numbering the N blocks so that each block has a corresponding subregion number;

(b) constructing a feature vector having N features as elements by calculating a feature for each of the N subregions in accordance with a prescribed criterion;

(c) constructing a total of (N−1) feature sets by retrieving the largest or smallest of the N elements of the feature vector to construct a first feature set consisting of one subregion number corresponding to the retrieved element, then retrieving the two largest or two smallest elements to construct a second feature set consisting of a combination of two subregion numbers corresponding to the two retrieved elements, and continuing such a retrieval and construction pattern until constructing the (N−1)th feature set consisting of a combination of (N−1) subregion numbers; and (d) by reference to a dictionary in which feature sets obtained by performing the steps (a) to (c) on various kinds of model patterns are prerecorded along with category names of the model patterns, obtaining similarities between the feature sets of the input pattern and the feature sets stored in the dictionary in corresponding relationship to the category names, and determining a category name that provides the greatest similarity, as the category name of the input pattern;

wherein dividing the region in step (a) means dividing the region into N subregions such that the sum of the values of dots is equal for any of the N subregions, and the feature calculated in step (b) is based on the area size of each individual subregion.

3. A method of pattern recognition according to claim 1, wherein the values of dots in each individual subregion are weighted according to the distance from a high bit/low bit boundary of the input pattern.

4. An apparatus for pattern recognition, comprising:

pattern input means for inputting a pattern to be recognized;

means for creating N subregions by dividing a region in which a pattern being an object of recognition is pictured into N blocks and numbering the N blocks so that each block has a corresponding subregion number;

means for constructing a feature vector having N features as elements by calculating a feature for each of the N subregions in accordance with a prescribed criterion;

means for constructing a total of (N−1) feature sets by retrieving the largest or smallest of the N elements of the feature vector to construct a first feature set consisting of one subregion number corresponding to the retrieved element, then retrieving the two largest or two smallest elements to construct a second feature set consisting of a combination of two subregion numbers corresponding to the two retrieved elements, and continuing such a retrieval and construction pattern until constructing the (N−1)th feature set consisting of a combination of (N−1) subregion numbers;

means for storing a dictionary in which feature sets obtained through processing performed on various kinds of model patterns by the pattern input means, the subregion creating means, the feature vector constructing means, and the feature set constructing means, are prerecorded along with category names of the model patterns; and means for obtaining similarities between the feature sets of the input pattern and the feature sets stored in the dictionary in corresponding relationship to the category names, and for determining the category name that provides the greatest similarity, as the category name of the input pattern;

wherein the subregion creating means divides the region in which a pattern being an object of recognition is pictured into N subregions of equal area size, and the feature vector constructing means calculates the feature based on the sum of the values of dots in each individual subregion.

5. An apparatus for pattern recognition, comprising:

pattern input means for inputting a pattern to be recognized;

means for creating N subregions by dividing a region in which a pattern being an object of recognition is pictured into N blocks and numbering the N blocks so that each block has a corresponding subregion number;

means for constructing a feature vector having N features as elements by calculating a feature for each of the N subregions in accordance with a prescribed criterion;

means for constructing a total of (N−1) feature sets by retrieving the largest or smallest of the N elements of the feature vector to construct a first feature set consisting of one subregion number corresponding to the retrieved element, then retrieving the two largest or two smallest elements to construct a second feature set consisting of a combination of two subregion numbers corresponding to the two retrieved elements, and continuing such a retrieval and construction pattern until constructing the (N−1)th feature set consisting of a combination of (N−1) subregion numbers;

means for storing a dictionary in which feature sets obtained through processing performed on various kinds of model patterns by the pattern input means, the subregion creating means, the feature vector constructing means, and the feature set constructing means, are prerecorded along with category names of the model patterns; and means for obtaining similarities between the feature sets of the input pattern and the feature sets stored in the dictionary in corresponding relationship to the category names, and for determining the category name that provides the greatest similarity, as the category name of the input pattern;

wherein the subregion creating means divides the region in which a pattern being an object of recognition is pictured into N subregions such that the sum of the values of dots is equal for any of the N subregions, and the feature vector constructing means calculates the feature based on the area size of each individual subregion.

6. An apparatus for pattern recognition according to claim 4, wherein the values of dots in each individual subregion are weighted according to the distance from a high bit/low bit boundary of the input pattern.

7. A method of creating a pattern recognition dictionary, comprising the steps of:

(a) creating N subregions by dividing a region in which a pattern being an object of recognition is pictured into N blocks and numbering the N blocks so that each block has a corresponding subregion number;

(b) constructing a feature vector having N features as elements by calculating a feature for each of the N subregions in accordance with a prescribed criterion;

(c) constructing a total of (N−1) feature sets by retrieving the largest or smallest of the N elements of the feature vector to construct a first feature set consisting of one subregion number corresponding to the retrieved element, then retrieving the two largest or two smallest elements to construct a second feature set consisting of a combination of two subregion numbers corresponding to the two retrieved elements, and continuing such a retrieval and construction pattern until constructing the (N−1)th feature set consisting of a combination of (N−1) subregion numbers; and (d) storing the feature sets in a designated memory by associating each of the feature sets with a category name of the model pattern;

wherein dividing the region in step (a) means dividing the region into N subregions of equal area size, and the feature calculated in step (b) is based on the sum of the values of dots in each individual subregion.

8. A method of creating a pattern recognition dictionary, comprising the steps of:

(a) creating N subregions by dividing a region in which a pattern being an object of recognition is pictured into N blocks and numbering the N blocks so that each block has a corresponding subregion number;

(b) constructing a feature vector having N features as elements by calculating a feature for each of the N subregions in accordance with a prescribed criterion;

(c) constructing a total of (N−1) feature sets by retrieving the largest or smallest of the N elements of the feature vector to construct a first feature set consisting of one subregion number corresponding to the retrieved element, then retrieving the two largest or two smallest elements to construct a second feature set consisting of a combination of two subregion numbers corresponding to the two retrieved elements, and continuing such a retrieval and construction pattern until constructing the (N−1)th feature set consisting of a combination of (N−1) subregion numbers; and (d) storing the feature sets in a designated memory by associating each of the feature sets with a category name of the model pattern;

wherein dividing the region in step (a) means dividing the region into N subregions such that the sum of the values of dots is equal for any of the N subregions, and the feature calculated in step (b) is based on the area size of each individual subregion.

9. A method of creating a pattern recognition dictionary according to claim 7, wherein the values of dots in each individual subregion are weighted according to the distance from a high bit/low bit boundary of the model pattern.

* * * * *